US010700634B2

(12) United States Patent
Flann

(10) Patent No.: US 10,700,634 B2
(45) Date of Patent: Jun. 30, 2020

(54) MECHANICAL SOLAR TRACKER

(71) Applicant: Nicholas Simon Flann, Smithfield, UT (US)

(72) Inventor: Nicholas Simon Flann, Smithfield, UT (US)

(73) Assignee: Utah State University

( * ) Notice: Subject to any disclaimer, the term of this patent is extended or adjusted under 35 U.S.C. 154(b) by 0 days.

(21) Appl. No.: 15/913,672

(22) Filed: Mar. 6, 2018

(65) Prior Publication Data

US 2019/0280642 A1 Sep. 12, 2019

(51) Int. Cl.
*H02S 20/32* (2014.01)
*F24S 30/458* (2018.01)
*F24S 30/00* (2018.01)

(52) U.S. Cl.
CPC .......... *H02S 20/32* (2014.12); *F24S 30/458* (2018.05); *F24S 2030/16* (2018.05)

(58) Field of Classification Search
CPC ................ H02S 20/32; F24S 30/458
See application file for complete search history.

(56) References Cited

U.S. PATENT DOCUMENTS

| 7,714,260 | B2 | 5/2010 | Carroll | |
|---|---|---|---|---|
| 2009/0260619 | A1 | 10/2009 | Bailey | |
| 2012/0042869 | A1 | 2/2012 | Wood | |
| 2012/0158362 | A1* | 6/2012 | Vandevelde | F24S 50/20 702/183 |
| 2012/0192917 | A1 | 8/2012 | Whitted | |
| 2013/0021471 | A1 | 1/2013 | Waterhouse | |
| 2013/0047977 | A1 | 2/2013 | Schmaelzle | |
| 2014/0283894 | A1* | 9/2014 | Silver | H02S 20/32 136/246 |
| 2015/0377519 | A1* | 12/2015 | Ryu | F24S 50/20 126/601 |

FOREIGN PATENT DOCUMENTS

CN 102563919 A 7/2012
DE 43 09 259 * 9/1994

OTHER PUBLICATIONS

Stoddard et al. Economic, Energy, and Environmental Benefits of Concentrating Solar Power in California. National Renewable Energy Laboratory. 2006.

(Continued)

*Primary Examiner* — Jayne L Mershon

(57) ABSTRACT

In embodiments, a mechanical solar tracker disclosed herein includes a frame, an elevation cam with an elevation cam surface attached to the frame, and a rotation drive mechanically coupled to the frame. A collector carriage is coupled to the rotation drive and configured to rotate circumferentially around a vertical axis. Also, a collector is connected to the collector carriage and a hinge is coupled between the collector and the collector carriage wherein the hinge is configured to rotate the collector about a horizontal plane at a pivot point. Additionally, a cam follower is coupled between the collector and the elevation cam and the cam follower is configured to translate, based on a surface input from the elevation cam surface, rotation of the collector about the pivot point to track the sun's direction, by tracing the elevation cam surface with the cam follower.

20 Claims, 28 Drawing Sheets

(56) References Cited

OTHER PUBLICATIONS

Array Technologies Inc. DuraTrack DA Specification. Albuquerque, NM. https://www.solaris-shop.com/content/DuraTrack%20DA%20Specifications.pdf.

Fathabai. Novel high efficient offline sensorless dual-axis solar tracker for using in photovoltaic systems and solar concentrators. Renewable Energy. Sep. 2016. pp. 485-594. vol. 95.

Patriot Solar Group. Astra 1kW 4 Panel Pole Mount Specification. Albion, Michigan. https://patriotsolargroup.com/psg2012/wp-content/uploads/Spec%20Sheets/solar%20mounts/pole-mount/ASTRA-1kW-SPEC-4-Panel-Pole-Mount-SLR-MTPL1000-4.pdf.

Linak. Focus on Solar Tracking. 2019. https://www.linak.com/business-areas/energy/solar-tracking/.

\* cited by examiner

MECHANICAL SOLAR TRACKER

TECHNICAL FIELD

The present disclosure relates to mechanical solar trackers, more particularly, to novel systems and methods for tracking, collecting, or reflecting solar energy.

BACKGROUND

Solar trackers are used to maximize solar collection onto a photovoltaic panel or to maximize reflected solar energy towards a predetermined location.

SUMMARY

The inventor of the present disclosure has identified the need for a reliable, low-cost, and accurate mechanical solar tracker. The present disclosure in aspects and embodiments addresses these various needs and problems.

The present disclosure covers apparatuses and associated methods for mechanical solar trackers. In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional" or "optionally" or "or" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

Example Mechanical Solar Trackers

Figure 1A:
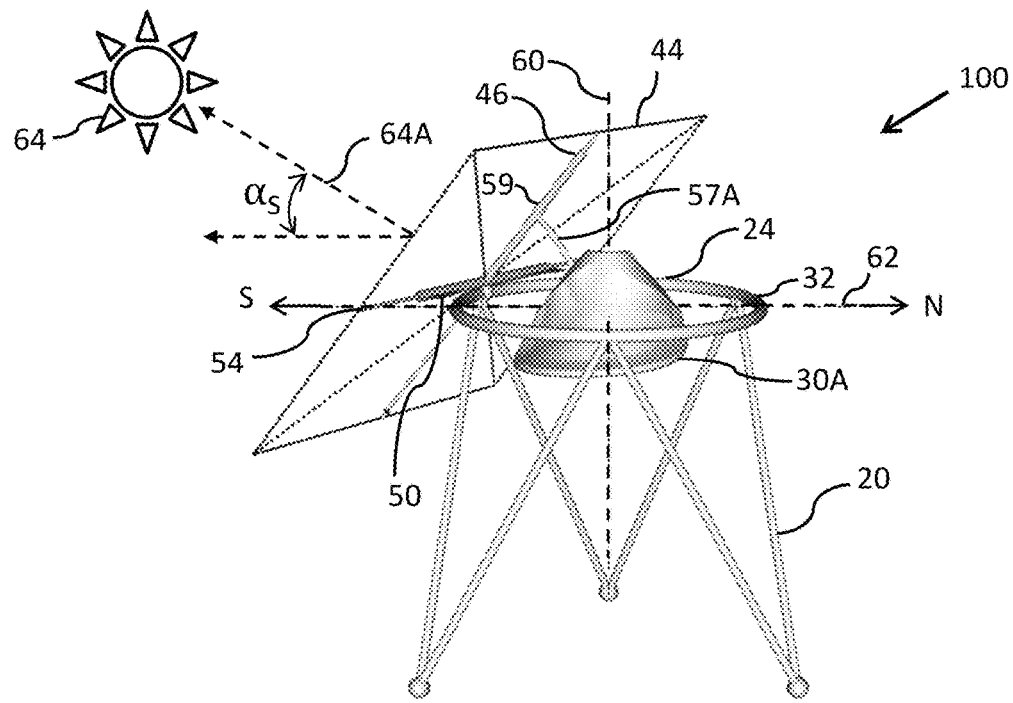
FIGS. 1A, 1B, and 1C are isometric views of three mechanical solar trackers that collect or reflect solar radiation.

FIG. 1A illustrates a mechanical solar tracker 100. Solar tracker 100 positions a collector 44, typically a solar panel or mirror, an array of solar panels, or an array of mirrors, normal to the direction 64A of the sun 64 during daylight hours. For purposes of this disclosure, a "collector" may refer to a solar panel collector 44 or a reflector 45, shown in FIG. 3A. For clarity, the outline of the collector 44 is illustrated as a series of dashed lines. The direction 64A of the sun 64 in the sky may be defined by two angles, the azimuth angle, $\psi S$ (illustrated in FIG. 9A), which is the compass bearing, relative to true (geographic) north, of a point on the horizon directly beneath the sun 64, and the elevation angle, $\alpha_S$, which is the angle between the sun 64 and the point on the horizon directly below the sun 64.

In embodiments, a mechanical solar tracker 100 includes a frame 20 that itself includes an elevation cam 30A. For purposes of this disclosure, a frame 20 includes support structure that secures a collector 44 to a foundation such as the ground, the roof of a building, or any similar structure.

Figure 1B:
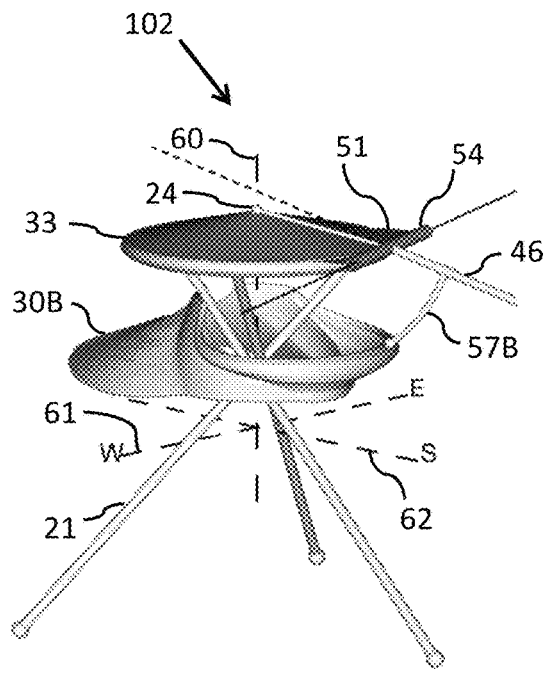
Figure 1C:
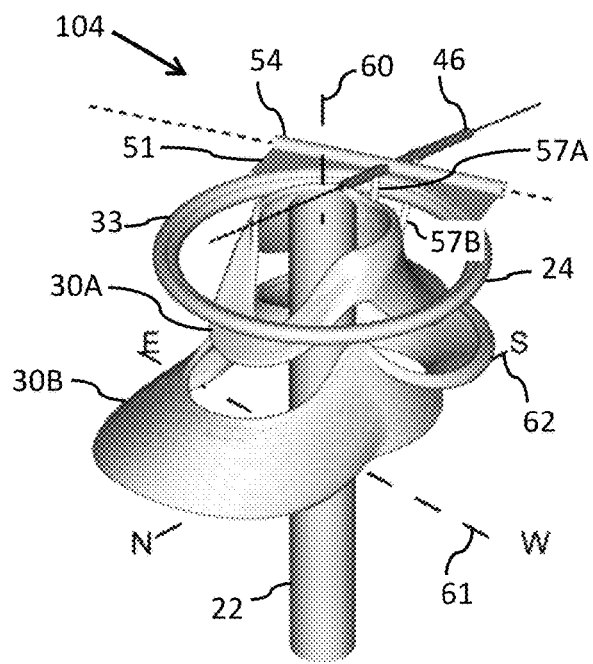

Additionally, a frame 20, as defined herein, also includes a tripod frame 21 (illustrated in FIG. 1B) or a pole 22 (illustrated in FIG. 1C).

Mechanical solar tracker 100 also includes a rotation drive 24. In embodiments, rotation drive 24 is mechanically coupled to the frame and a collector carriage 50 or a turntable carriage 51 (shown in FIGS. 1B and 1C). A rotation drive 24 may cause collector carriage 50 to travel on a rotation ring or turntable bearing 32 circumferentially around vertical axis 60 according to the azimuth angle $\psi_S$ of the sun 64. A rotation drive 24 may be incorporated as part of the rotation ring or turntable bearing 32, part of the collector carriage 50 or a turntable carriage 51, or a separate rotation drive 24.

The collector carriage 50 may support the weight of the collector 44 as the collector 44 and collector carriage 50 move circumferentially around the ring 32 to track the sun's 64 azimuth angle $\psi S$ (illustrated in FIG. 9A) during daylight hours. In this embodiment, the collector carriage 50 rotates one revolution over a 24-hour period.

Figure 10A:
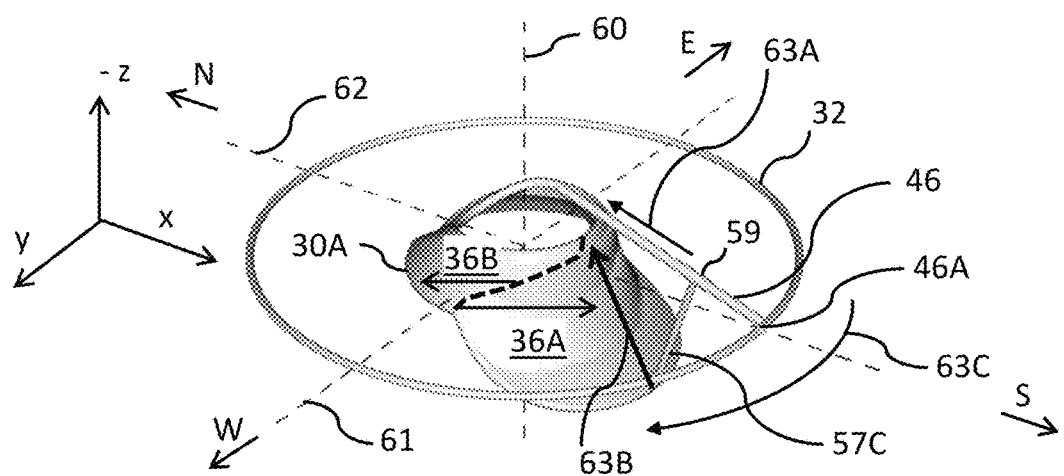
FIGS. 10A, 10B, 10C, and 10D illustrate portions of a mechanical solar tracker containing an inside-elevation cam.

Similarly, as the collector carriage 50 rotates circumferentially about the vertical axis 60 on the rotation ring or turntable bearing 32, the collector 44 may be hingedly coupled to the collector carriage 50 and configured to rotate about a horizontal plane at a pivot point 46A (illustrated in FIG. 10A and others). As the collector carriage 50 and collector 44 move circumferentially, the collector 44 tracks the elevation angle $\alpha_S$ of the sun 64 during daylight hours based on input from the multi-day, 24-hour, inside-elevation cam 30A.

The elevation cam 30A surface is customized to the latitude location of the mechanical solar tracker. Described differently, in embodiments, an elevation cam surface, such as elevation cam 30A surface, is determined based on the latitude location of the mechanical solar tracker and provides the elevational control of the mechanical solar tracker 100 to track the sun's elevation angle $\alpha_S$ during daylight hours. In this specific example, the shape of elevation cam 30A is specific to a mechanical solar tracker located at the latitude of the campus of Utah State University in Logan, Utah.

FIG. 1A also illustrates a cam follower 57A, cam follower travel rod 46, cam-follower travel rod sleeve 59, and horizontal stabilizing rod 54. The horizontal stabilizing rod may house a hinge that couples the collector 44 to the collector carriage 50. In this embodiment, the cam follower 57A is coupled between collector 44 and the elevation cam 30A. The cam follower 57 is configured to translate, based on a surface input from the elevation cam 30A surface, rotation of the collector 44 about a pivot point 46A. Described differently, the cam follower 57A translates mechanical input from the elevation cam 30A for the collector 44 to track the sun's elevation angle $\alpha_S$ during daylight and a storage position during night. This tracking and positioning may be done by tracing the elevation cam 30A surface with the cam follower 57A as the sun 64 appears to move across the sky over a period of time.

In FIG. 1A and other figures, the cardinal directions may be labeled as N for north, S for south, E for east, and W for west. East-west axis 61 and north-south axis 62 may also be illustrated and labeled. The cardinal directions and imaginary axis are provided in the figures to illustrate the orientation of the various mechanical solar trackers.

FIG. 1B illustrates mechanical solar tracker 102. Mechanical solar tracker 102 includes a tripod frame 21 and a rotation ring or turntable bearing 33 with a turntable carriage 51. FIG. 1B, and other figures described herein, do not show a collector, such as collector 44, as its illustration would obscure the view of other parts of mechanical solar tracker 102. However, in this embodiment and other embodiments, a mechanical solar tracker 102 includes a collector 44 or reflector 45, shown in other figures. In FIG. 1B and other illustrations, the orientation of a collector on a mechanical solar tracker, such as mechanical solar tracker 102, can be imagined as being parallel to an imaginary plane created by the intersection of the horizontal stabilizing rod 54 and the cam follower travel rod 46. In this embodiment, the horizontal stabilizing rod 54 and the cam follower travel rod 46 form part of the turntable carriage 51 and support the weight of a collector 44 or reflector 45 (shown in other figures).

In embodiments, a horizontal stabilizing rod 54 is hingedly coupled to the turntable carriage 51 and fixed to a collector (shown in FIG. 1A). As the sun appears to move across the sky, turntable carriage 51 (and a solar collector or reflector attached thereto) is configured to track the sun's azimuth angle Is (not labeled) via rotation drive 24 by rotating circumferentially around vertical axis 60. Similarly, the horizontal stabilizing rod 54 is configured to rotate a collector 44 (shown in FIG. 1) relative to a horizontal plane (not labeled) while supporting the weight and other loads (wind, snow, seismic) of the collector 44. For purposes of this disclosure, a horizontal plane is a reference plane that is parallel to the ground surface. In embodiments, the center of gravity of the collector 44 may be centered on the horizontal stabilizing rod 54 to minimize loads transferred to an elevation cam, such as elevation cams 30A or 30B. In this manner, the turntable carriage 51 (or collector carriage 50 in FIG. 1) and the turntable bearing 33 (or ring 32) bear the weight of the collector 44.

FIG. 1B also illustrates a curved cam follower 57B interfacing with multi-day, 24-hour, outside elevation cam 30B. Elevation cam 30B surface is customized to the latitude location of mechanical solar tracker 102 and provides the elevational control to track the sun's elevation angle $\alpha_S$ during daylight hours. Cam follower 57B is coupled between the horizontal stabilizing rod 54 or the collector 44 and the elevation cam 30B. The cam follower 57B is configured to translate, based on surface input from the elevation cam 30B, rotation of the horizontal stabilizing rod 54 and the collector 44 relative to the horizontal plane. Similarly, cam follower travel rod 46 is configured to tilt according to the sun's elevation angle $\alpha_S$ (not labeled) during daylight hours based on input from elevation cam 30B through the cam follower 57B.

The combination of the horizontal stabilizing rod 54, the cam follower 57B, and the elevation cam 30B, work to move the elevation angle $\alpha_T$ of the collector 44, which in this embodiment is the angle between the sun's location in the sky and the point on the horizon directly below the sun's location.

FIG. 1C illustrates mechanical solar tracker 104, but does not illustrate a collector as its illustration would obscure the view of the components of mechanical solar tracker 104. Mechanical solar tracker 104 includes turntable carriage 51 with horizontal stabilizing rod 54 and cam follower travel rod 46. Turntable carriage 51 rotates on rotation ring or turntable bearing 33, which combined, support the weight of a collector (not shown). Turntable carriage 51, together with horizontal stabilizing rod 54 and cam follower travel rod 46 rotate circumferentially around vertical axis 60 to track the sun's azimuth (not shown) during daylight hours.

Mechanical solar tracker 104 includes a pole 22 and both a multi-day, 24-hour, inside-elevation cam 30A and a multi-day, 24-hour, outside-elevation cam 30B. Both elevation cams 30A and 30B provide the elevational control to track the sun's elevation angle α (not shown) during daylight hours.

In this embodiment, both elevation cams 30A and 30B with their corresponding surfaces are attached to the frame, or in this case a pole 22. Mechanical solar tracker 104 also includes cam followers 57A and 57B, each coupled to their respective elevation cams 30A and 30B. In this embodiment, the combination of cam follower 57A coupled between cam-follower travel-rod 46 and elevation cam 30A, cam follower 57B coupled between cam-follower travel-rod 46 and elevation cam 30B, the hinge (in this illustration, the hinge is within horizontal stabilizing rod 54) coupled between the carriage (not shown) or the turntable carriage 51, and the rotation drive 24, together provide a kinematic or semi-kinematic interface between the collector and the frame.

For purposes of this disclosure, a kinematic interface is fully constrained in all six degrees of freedom and no degree of freedom is over constrained. Also, for purposes of this disclosure, a semi-kinematic interface allows for slight overconstraint in one or more degrees of freedom. In embodiments, a kinematic or semi-kinematic interface between the collector and the frame helps increase the pointing accuracy of the mechanical solar tracker. This can be especially helpful in solar reflective applications described below in relation to FIGS. 3A-3C, and FIG. 9B.

As in other figures, the orientation of a collector may be imagined as an imaginary plane formed by the intersection of the horizontal stabilizing rod 54 and cam follower travel rod 46—in this case the normal direction of the plane is pointing almost directly vertical as a collector would be facing normal to the sun's direction at noon during summer solstice.

FIGS. 1A, 1B, and 1C illustrate various parts that are interchangeable between mechanical solar tracker embodiments. For example, FIGS. 1A, 1B, and 1C illustrate three mounting mechanisms for a mechanical solar tracker: a frame 20, a tripod 21, and a pole 22. The frame 20, tripod 21, and pole 22 may be interchangeable with mechanical solar trackers 100, 102, 104 and other mechanical solar trackers described herein.

FIGS. 1A, 1B, and 1C also illustrate a multi-day, 24-hour, inside-elevation cam 30A and a multi-day, 24-hour, outside-elevation cam 30B. As shown, a mechanical solar tracker may have one multi-day, 24-hour, inside-elevation cam 30A, one multi-day, 24-hour, outside-elevation cam 30B, or both a multi-day, 24-hour, inside-elevation cam 30A and a multi-day, 24-hour, outside-elevation cam 30B. The difference between a multi-day, 24-hour, inside-elevation cam 30A and a multi-day, 24-hour, outside-elevation cam 30B is described below.

FIGS. 1A, 1B, and 1C also illustrate a collector carriage 50 mounted on a ring 32 (in FIG. 1A) or a turntable carriage 51 mounted on a rotation ring or turntable bearing 33 (in FIGS. 1B and 1C). In various illustrated embodiments of mechanical solar trackers described herein, the weight of the collector, together with accompanying wind, snow, and seismic loads, are distributed through a collector carriage 50 or turntable carriage 51 and through a ring 32 or a rotation ring or turntable bearing 33. The loads are then carried by a frame 20, tripod 21, pole 22, or similar structure. Distributing the loads through these various components provides some advantages over traditional solar trackers that concentrate loads through a few actuators. Because embodiments described herein distribute the loads, components of a mechanical solar tracker described herein may be made with smaller parts and require less material to build and install.

Additionally, a frame 20 or tripod 21 provide some advantages over typical pole-mount solar trackers in that they are able to distribute to the ground the accompanying wind, snow, and seismic loads of a mechanical solar tracker and thus require much smaller footings or a foundation with little (or no) concrete for installation.

FIG. 1A, 1B, 1C and other figures described herein, also illustrate the east-west axis 61 and north-south axis 62 as well as the orientation of the illustrated mechanical solar tracker relative to the cardinal coordinates.

Figure 2A:
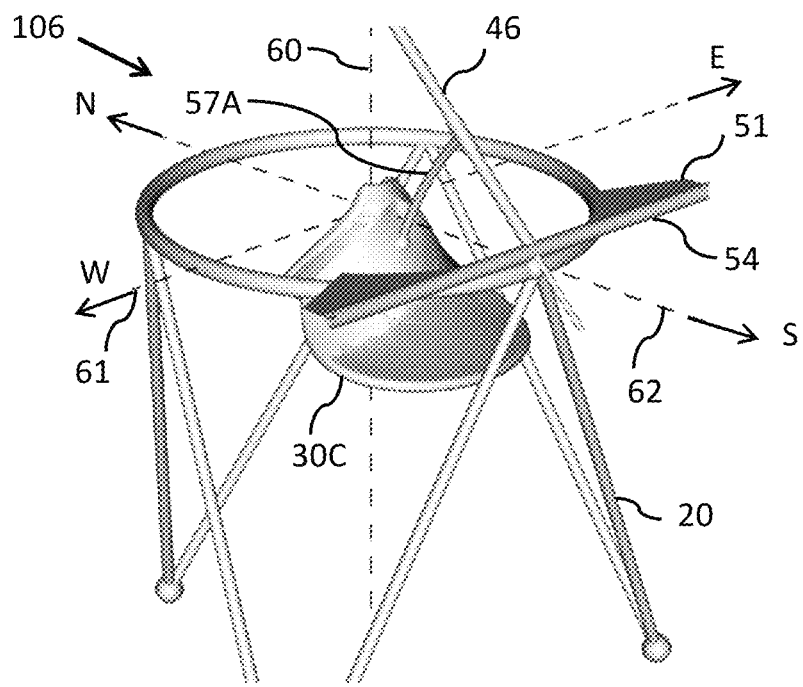
FIGS. 2A and 2B are isometric views of two other mechanical solar trackers that also collect or reflect solar radiation.

FIG. 2A illustrates mechanical solar tracker 106 with a multi-day, daylight-hour, inside-elevation cam 30C mounted to a frame 20. Other components include cam follower travel rod 46, turntable carriage 51, horizontal stabilizing rod 54, and curved cam follower 57A. As in other figures, a collector or reflector is not shown but its position and orientation may be imagined as being parallel to an imaginary plane created by the intersection of the horizontal stabilizing rod 54 and the cam follower travel rod 46.

Similar to other embodiments, turntable carriage 51, together with horizontal stabilizing rod 54 and cam follower travel rod 46 rotate circumferentially around vertical axis 60 to track the sun's azimuth (not shown) during daylight hours. However, in contrast to previous embodiments, the turntable carriage 51 rotates clockwise (looking down) only during daylight hours as the curved cam follower 57A traces the surface of the multi-day, daylight-hour, inside-elevation cam 30C. At some time during the night, or between dusk and dawn, the turntable carriage 51 rotates counter-clockwise to reset its position to track the sun's position, both azimuth and elevation, in the morning.

Figure 2B:
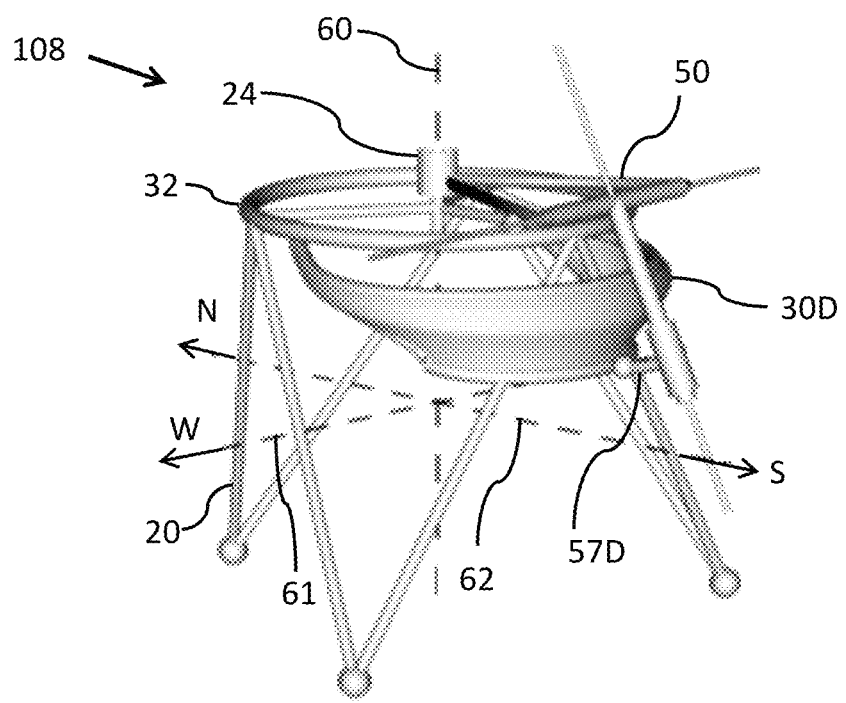

FIG. 2B illustrates a similar mechanical solar tracker 108 with a multi-day, daylight-hour, outside-elevation cam 30D. Other components include a collector carriage 50, straight-cam follower 57D, ring 32, rotation drive 24, and frame 20. In this embodiment, rotation drive 24 moves collector carriage 50, together with a collector (not shown), circumferentially around vertical axis 60 along ring 32 clockwise (looking down) during daylight hours. Straight-cam follower 57D traces the surface of multi-day, daylight-hour, outside-elevation cam 30D to track the sun's elevation during daylight hours. As with other embodiments containing a daylight-hour elevation cam, drive 24 moves collector carriage 50 back to a morning or reset position during the night such that the mechanical solar tracker 108 is ready to track the sun's position again in the morning.

Figure 3A:
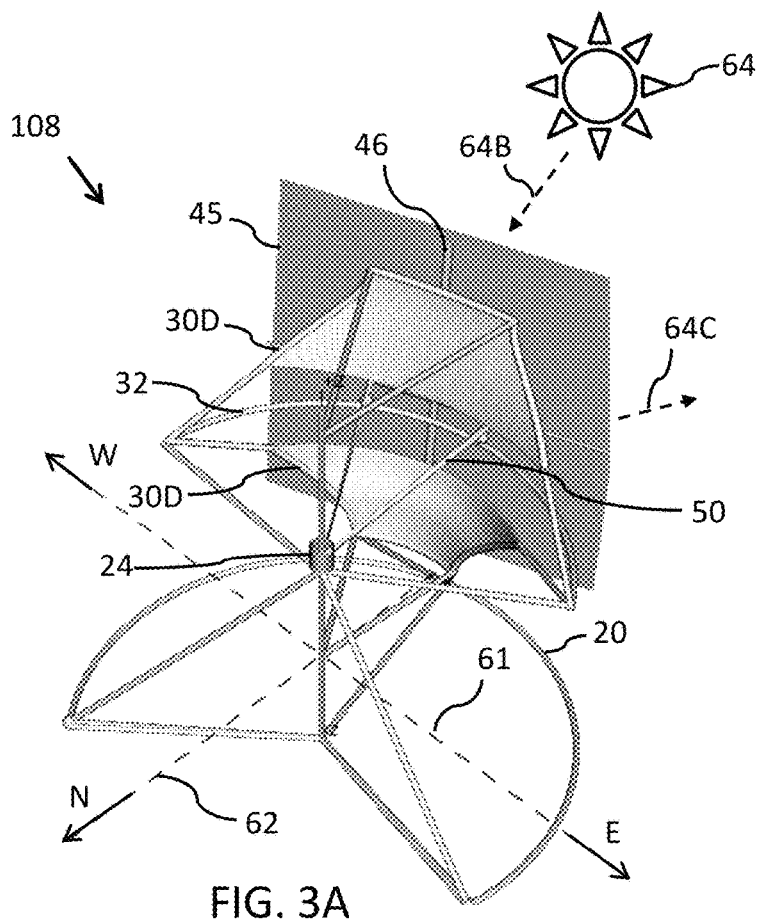
FIGS. 3A, 3B, and 3C are isometric views of a mechanical solar tracker that also collect or reflect solar radiation.
Figure 3B:
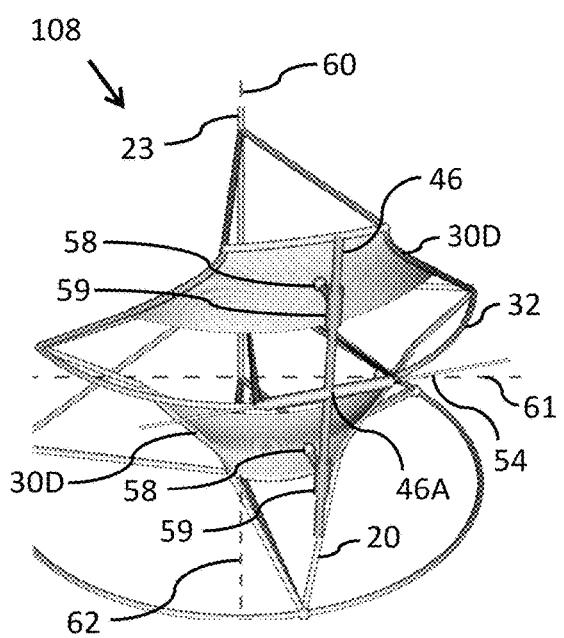
Figure 3C:
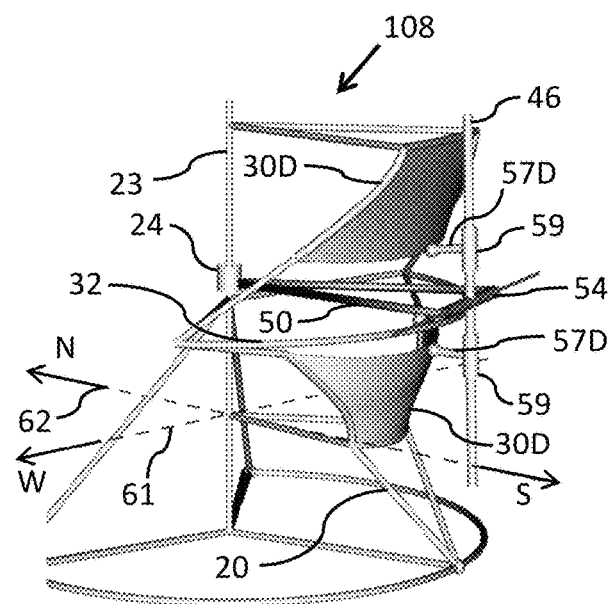

FIGS. 3A, 3B, and 3C illustrate another mechanical solar tracker 108 from various perspectives, with and without a solar reflector 45. Mechanical solar tracker 108 reflects (usually with a mirror) reflected sunlight 64C from the sun 64 with reflector 45 towards a pre-designated location. Rjukan, Norway has solar reflectors, different from mechanical solar tracker 108, reflecting sunlight towards its town center. In this specific example, mechanical solar tracker 108 may be used to reflect, during daylight hours only, sunlight 64B from the top of a mountain near Rjukan, Norway into the town center itself.

Mechanical solar tracker 108 includes a rotation drive 24. Rotation drive 24 configured to rotate the cam follower travel rod 46 (and a collector attached to the cam follower travel rod 46) a first circumferential rotation direction during daylight and a second circumferential rotation direction during night-time.

FIGS. 3B and 3C illustrate mechanical solar tracker 108 in a different orientation and without a solar reflector to show some of the other parts of mechanical solar tracker 108. Mechanical solar tracker 108 includes two multi-day, daylight-hour, outside-cams 30D. Mechanical solar tracker 108 also includes a frame 20, a ring 32, a collector carriage 50, two cam sliders 58 (one for each cam 30D), and two vertical support-rod sleeves 59. Each support-rod sleeve 59 connects to a cam follower 57D. FIGS. 3B and 3C also illustrate cam follower travel rod 46, collector carriage 50, ring 32, drive shaft 23, rotation drive 24, horizontal stabilizing rod 54, and pivot point 46A.

The two multi-day, daylight-hour, outside-cams 30D in mechanical solar tracker 108 in FIGS. 3B and 3C helps with pointing accuracy of the mechanical solar tracker 108. Mechanical solar tracker 108 includes cam followers 57D, each coupled to their respective elevation cams 30D. In this embodiment, the combination of both cam followers 57D coupled between cam-follower travel-rod 46 and elevation cams 57D, the hinge coupled between cam-follower travel-rod 46 (or the collector, which is not shown) and the carriage 50 (in this illustration, the hinge is within horizontal stabilizing rod 54), and the rotation drive 24, together provide a kinematic or semi-kinematic interface between the collector (not shown) and the frame 20.

As in other embodiments, a kinematic or semi-kinematic interface between the collector (not shown) and the frame 20 helps increase the pointing accuracy of the mechanical solar tracker 108. This can be especially helpful in solar reflective applications described below in relation to FIG. 9B.

Figure 4A:
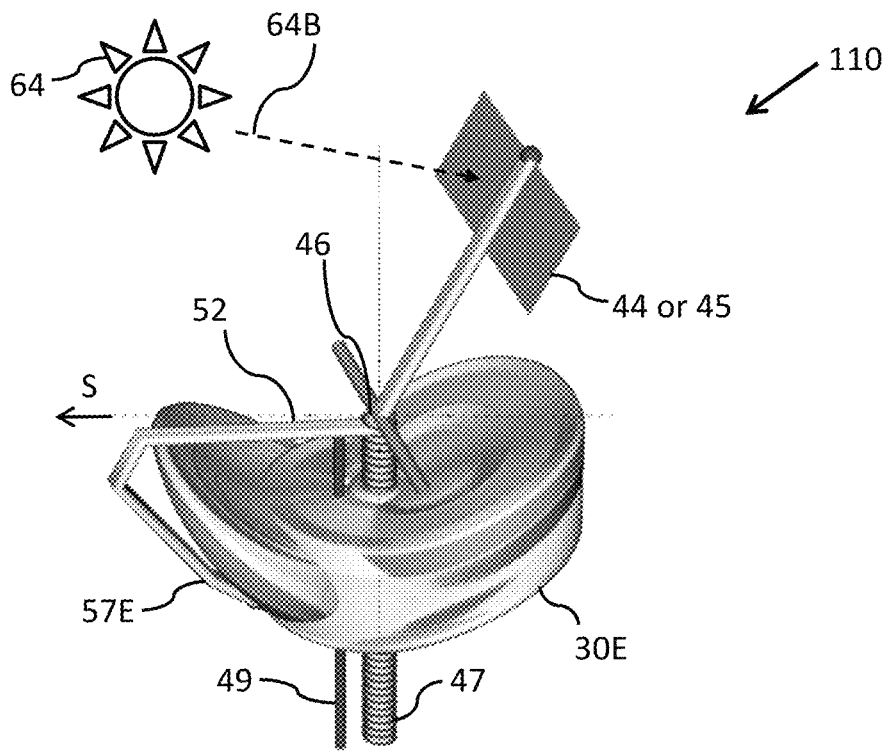
FIGS. 4A and 4B are isometric views of two other mechanical solar trackers that also collect or reflect solar radiation.

FIG. 4A illustrates mechanical solar tracker 110 with a multi-day, 24-hour, center moving elevation cam 30E, tipper arm 52, cam keeper 49, and center-moving cam, straight-cam follower 57E. FIG. 4A also illustrates a collector 44 or reflector 45, which is not to scale. The collector 44 or reflector 45 is also shown mounted on the cam follower travel rod 46, however, other locations are possible.

As will be described in more detail below, mechanical solar tracker 110 orients the collector 44 normal to the sun's rays 64B, or reflects the sun's rays 64B to a point, by moving the center-moving elevation cam 30E up and down the drive screw 47. The cam keeper 49 prevents the center-moving cam 30 from rotating about the drive screw 47. In this embodiment, the tipper arm 52, cam follower travel rod 46, and collector 44 or reflector 45 are all rigidly coupled to the drive screw 47. As the drive screw rotates clockwise, the tipper arm 52, cam follower travel rod 46, and collector 44 or reflector 45 track the sun's 64 position. The rotational movement tracks the sun's 64 azimuth. Similarly, the center moving elevation cam 30, together with the cam follower 57E, tip the collector 44 or reflector 45 (and the mechanical solar tracker 110 parts connected to the collector 44 or reflector 45) to the proper elevation angle to either collect or reflect the sun's 64 solar rays 64B. In FIG. 4A, the mechanical solar tracker 110 is pointing the collector towards the sun 64 on Jan. 26, 2018, from a latitude location of Logan, Utah.

Figure 4B:
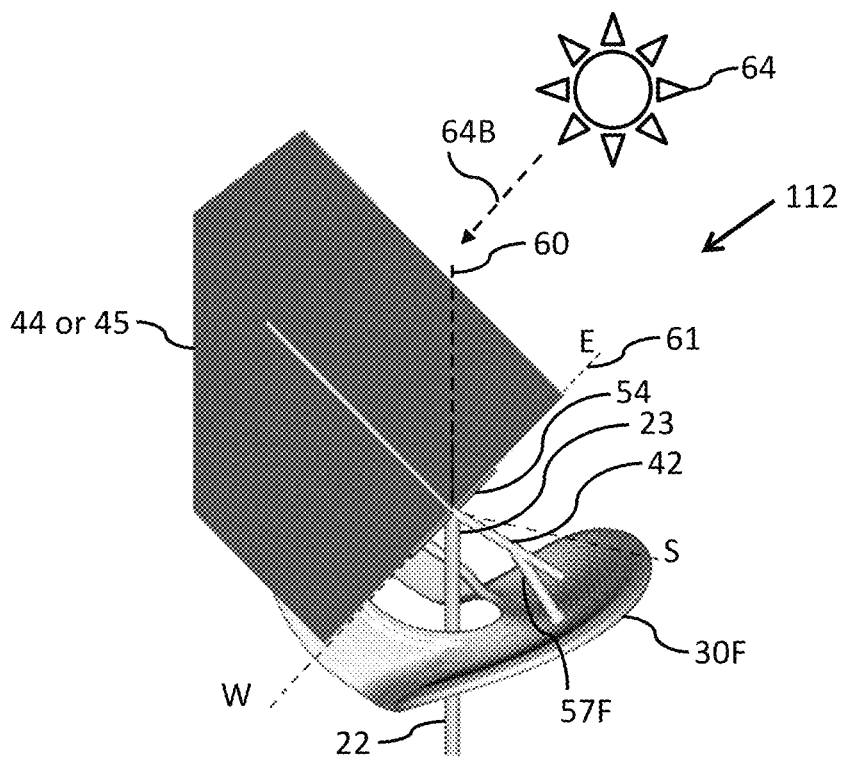

FIG. 4B illustrates mechanical solar tracker 112 with multi-day, 24-hour, center-fixed elevation cam 30F, tipper rod 42, drive shaft 23, horizontal stabilizing rod 54, and collector 44 or reflector 45. In this embodiment, cam 30F is fixed such that it does not move up and down vertically relative to the pole 22. Instead, as the sun tracks across the sky, drive shaft 23 and solar collector 44 or reflector 45 are configured to track the sun's azimuth (not labeled) by rotating around vertical axis 60. Similarly, tipper rod 42 and solar collector 44 or reflector 45 are configured to tilt according to the sun's elevation angle (not labeled) during daylight hours based on input from center-fixed elevation cam 30F and cam follower 57F.

Figure 5A:
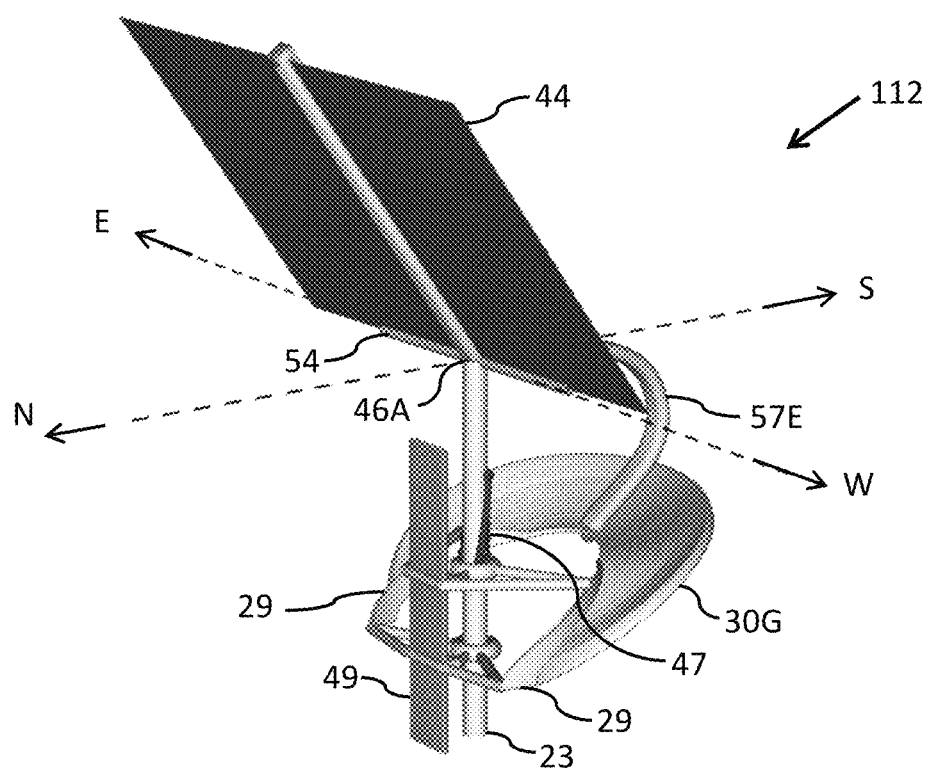
FIGS. 5A and 5B are isometric views of two other mechanical solar trackers that also collect or reflect solar radiation.

FIG. 5A illustrates mechanical solar tracker 112 that includes a multi-day, daylight-hour, center-moving elevation cam 30G. The elevation cam 30G includes a day-cam stops 29, which retains the cam follower 57E on the elevation cam 30G at the beginning or end of a daytime cycle. Mechanical solar tracker 112 also includes a drive shaft 23, drive screw 47, horizontal stabilizing rod 54, and cam keeper 49. In this example embodiment, the drive shaft 23 and drive screw 47 are coupled together. As the drive shaft 23 rotates from east to west to track the sun's azimuth, the cam follower 57E tracks the surface of the elevation cam 30G and angles the collector 44 at pivot point 46A to track the sun's elevation angle in the sky. At the end of each day, or at the end of a daylight cycle, the drive shaft 23 rotates from west to east to be ready to track the sun for the next daylight cycle. Additionally, the drive screw 47 advances the center-moving elevation cam 30G up or down (relative to the drive shaft 23 and drive screw 47) such that the cam follower 57E tracks a different part of the surface of elevation cam 30G. Different portions of elevation cam 30G surface correspond to a tracking surface the provides the correct elevation angle tracking for a given day. This movement is described in more detail below.

Figure 5B:
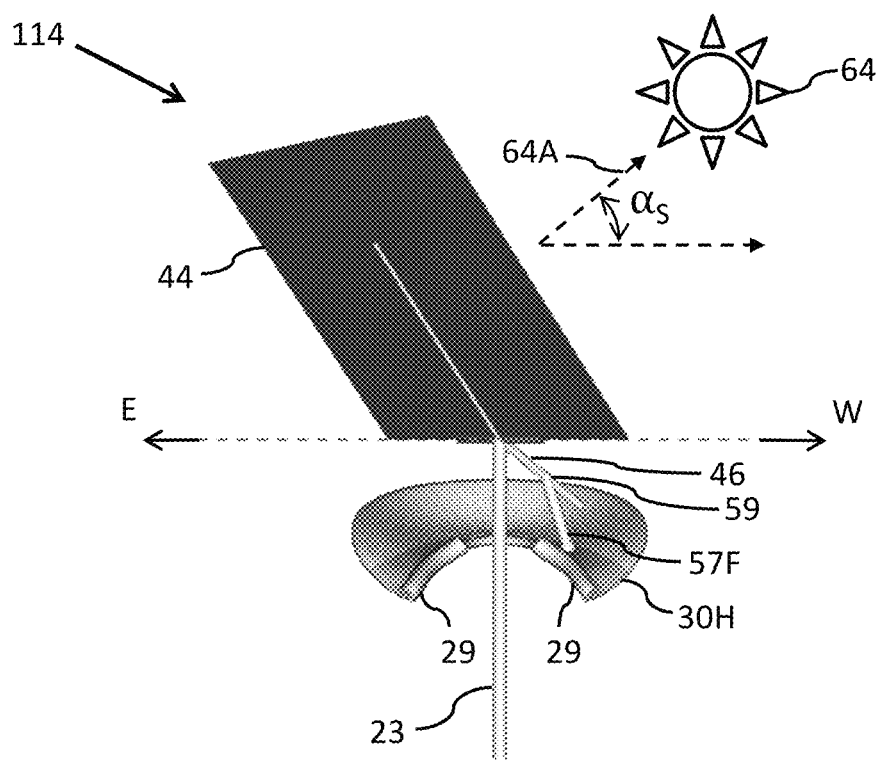

FIG. 5B illustrates mechanical solar tracker 114 that includes a multi-day, daylight-hour, center-fixed elevation cam 30H. Mechanical solar tracker 114 also includes a drive shaft 23 which rotates a collector 44 to track the sun's azimuth, $\alpha_S$. Elevation cam 30H also includes day-cam stops 29. In this embodiment, drive shaft 23 rotates from East to West as cam follower 57F traces the surface of elevation cam 30H such that the collector 44 tracks the direction 64A of the sun 64 or the elevation angle $\alpha_S$ during daylight hours. After a daylight cycle, drive shaft 23 rotates from west to east to reset the mechanical solar tracker 114 to track the sun 64 the next day. In addition, cam follower travel rod sleeve 59 is configured to move up and down cam follower travel rod 46 according to the day of the year and the path cam follower 57F traces on the surface of elevation cam 30H.

Figure 6:
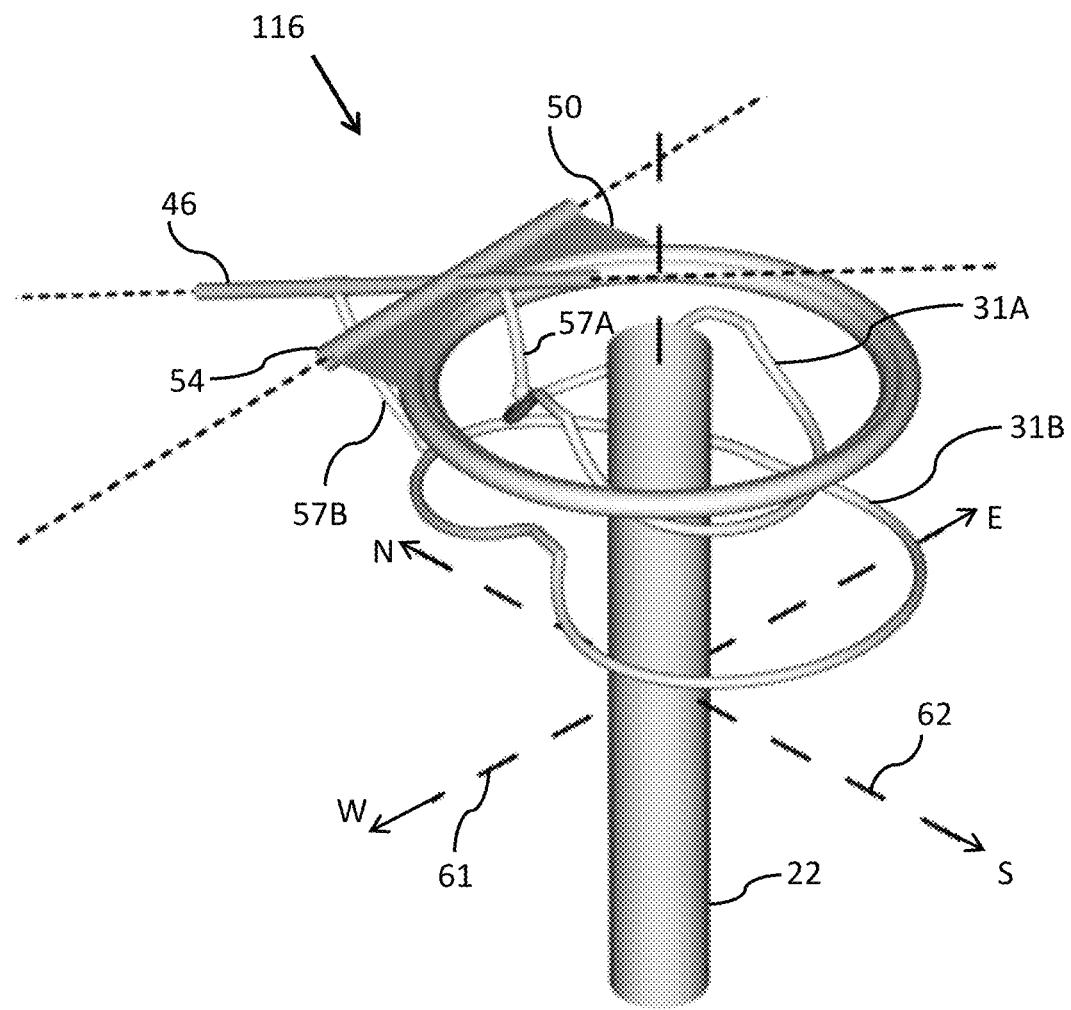
FIG. 6 is an isometric view of another mechanical solar tracker.

FIG. 6 illustrates another mechanical solar tracker 116. Mechanical solar tracker 116 also tracks the position of a collector (not shown) normal to the direction of the sun during daylight hours. FIG. 6 does not show a collector, such as collector 44, as its illustration would obscure the view of other parts of mechanical solar tracker 116. However, the orientation of a collector on mechanical solar tracker 116 can be imagined as being parallel to an imaginary plane created by the intersection of the horizontal stabilizing rod 54 and the cam follower travel rod 46.

Mechanical solar tracker 116 is mounted on a pole 22 and includes a collector carriage 50, horizontal stabilizing rod 54, and cam follower travel rod 46. In addition, mechanical solar tracker 116 is configured to move a collector a full 360-degrees over a 24-hour period. Mechanical solar tracker 116 includes two single-day elevation cams 31A and 31B. Single-day elevation cams 31A and 31B are shaped to position the collector 44 direction normal to the sun's elevation based on a single, optimized day, as opposed to multiple days of the year. Single-day elevation cams 31A and 31B are also specifically designed for a latitude on the campus of Utah State University in Logan, Utah. Mechanical solar tracker 116 also includes two curved-cam followers, 57A and 57B. Curved-cam follower 57A traces single-day, outside-elevation cam 31A and curved cam follower 57B traces single-day, inside-elevation cam 31B.

Figure 7A:
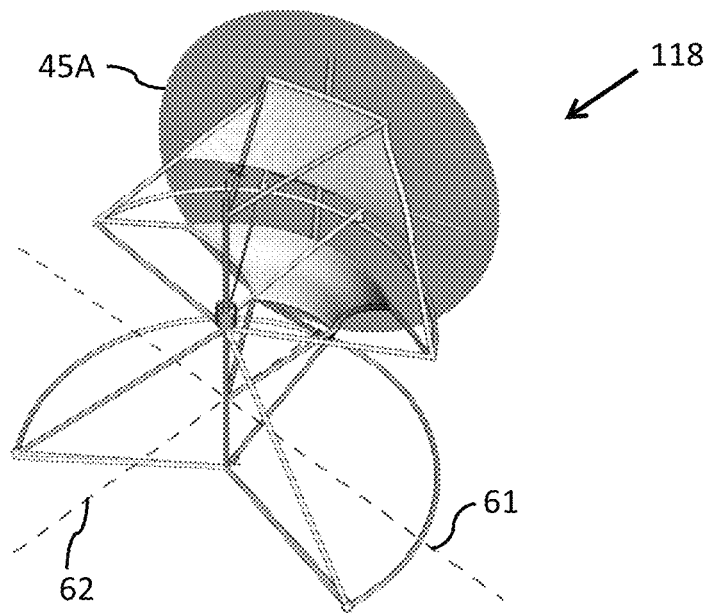
FIGS. 7A and 7B are isometric views of two other mechanical solar trackers that also collect or reflect solar radiation.
Figure 7B:
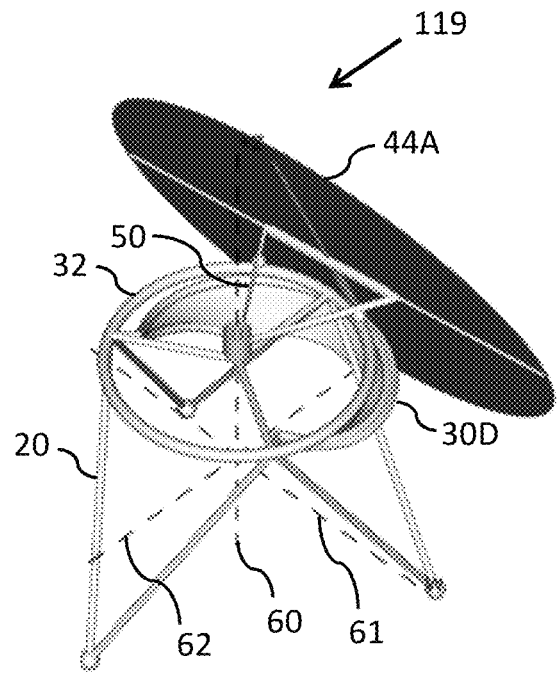

FIGS. 7A and 7B illustrates mechanical solar trackers 118 and 119, respectively. Mechanical solar tracker 118 has a round reflector 45A and mechanical solar tracker 119 has a round solar collector 44A. Other shapes for solar reflectors or collectors, including square, rectangular, oval, and multi-side polygons are possible. FIG. 7B also illustrates mechanical solar tracker 119 with a multi-day, daylight-hour, outside-elevation cam 30D, collector carriage 50, ring 32, and frame 20. FIGS. 7A and 7B illustrate that mechanical solar trackers may use any shape reflector or collector.

FIGS. 1 through 7 illustrate various mechanical solar tracker embodiments that collect or reflect sunlight. The embodiments of the mechanical solar trackers described herein may rotate 360 degrees over a 24-hour period (FIGS. 1A, 1B, 1C, 2A, 2B, 4A, 4B, and 6) or may track the sun's azimuth during daylight hours only (FIGS. 3A, 3B, 3C, 5A, 5B, 7A, and 7B) and then reset for the next day's operation. The mechanical solar tracker embodiments may include just an inside-elevation cam, such as cam 30A in FIG. 1A, or just an outside-elevation cam, such as cam 30B in FIG. 1B. Alternatively, a mechanical solar tracker embodiment may include both an inside- and an outside-elevation cam, such as elevation cams 30A and 30B shown in FIG. 1C. In other embodiments, a mechanical solar tracker may include two outside elevation cams 30D, such as shown in FIGS. 3A, 3B, and 3C. Mechanical solar trackers may be mounted on a frame, such as frames 20 illustrated in FIGS. 1A, 2A, 2B, 3A, 3B, 3C, 7A, and 7B. Mechanical solar trackers may also be mounted on a pole, such as pole 22 illustrated in FIGS. 1C, 4B, and 6, or a tripod, such as tripod 21 illustrated in FIG. 1B. Mechanical solar trackers may employ various types of collector carriages, for example, collector carriage 50 illustrated in FIG. 1A, or turntable carriage 51 illustrated in FIGS. 1B and 1C. The various mechanical solar tracker components may be interchanged depending on design constrains and the location of the mechanical solar tracker, as described below.

Combining Multiple Collectors or Reflectors

Figure 8A:
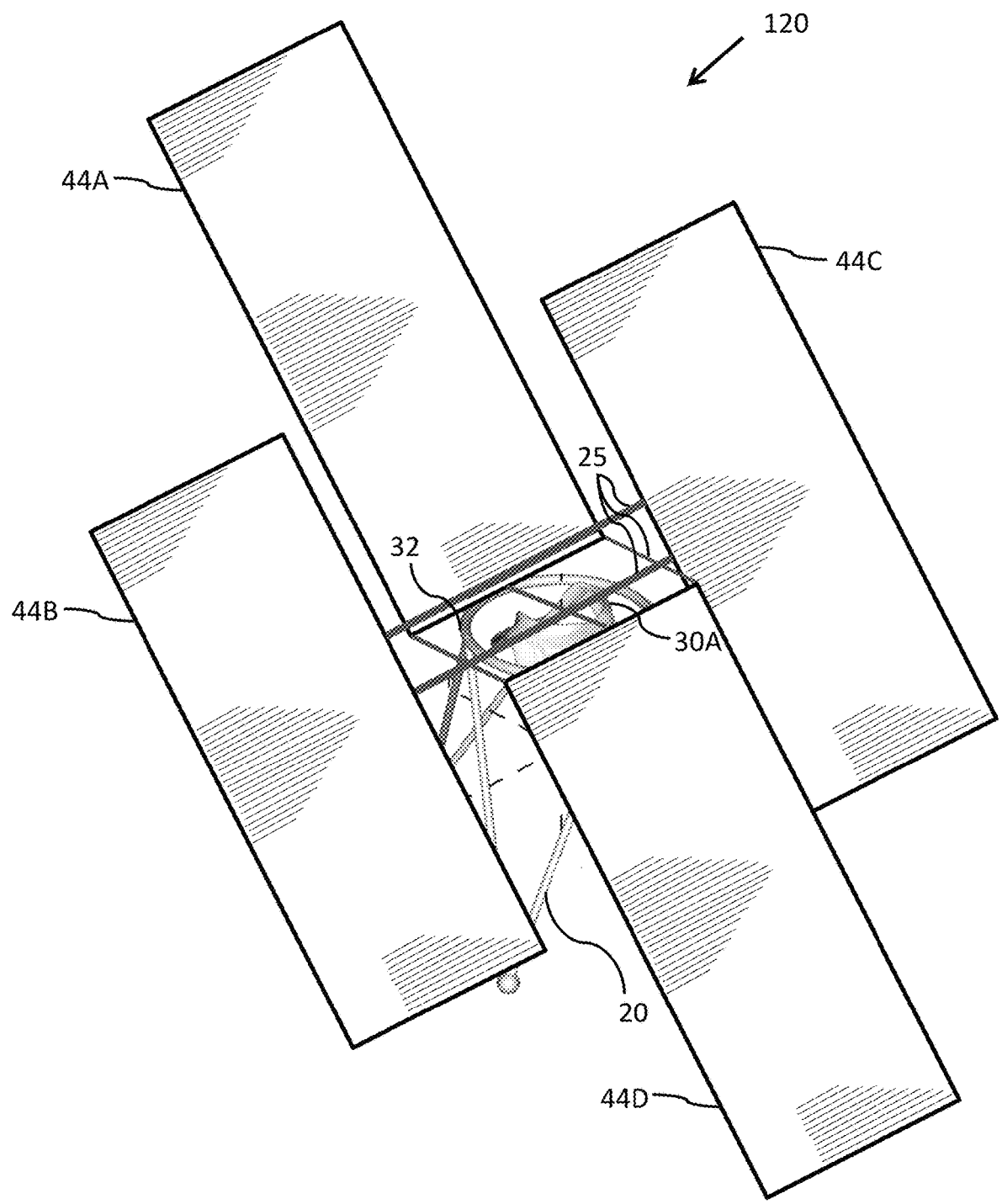
FIG. 8A is an isometric view of a mechanical solar tracker with multiple solar collectors.

FIG. 8A illustrates a mechanical solar tracker 120 with a single, multi-day, daytime, inside elevation cam 30A and multiple collectors 44, in this case four collectors 44A-D. The collectors 44A-D are coupled together via linkage bars 25 to rotate circumferentially on ring 32 and tilt based on input from the single, inside elevation cam 30A.

In FIG. 8A, and in embodiments, the collectors 44A-D are distinct surfaces mechanically coupled to move together. The distinct surfaces exploit three dimensions such that the surfaces of collectors 44B and 44C are in the same plane, collector 44A is in another plane, and 44D is in yet another plane. The distinct surfaces minimize wind loads by breaking up the surfaces which allows the wind to pass between the individual collectors.

Figure 8B:
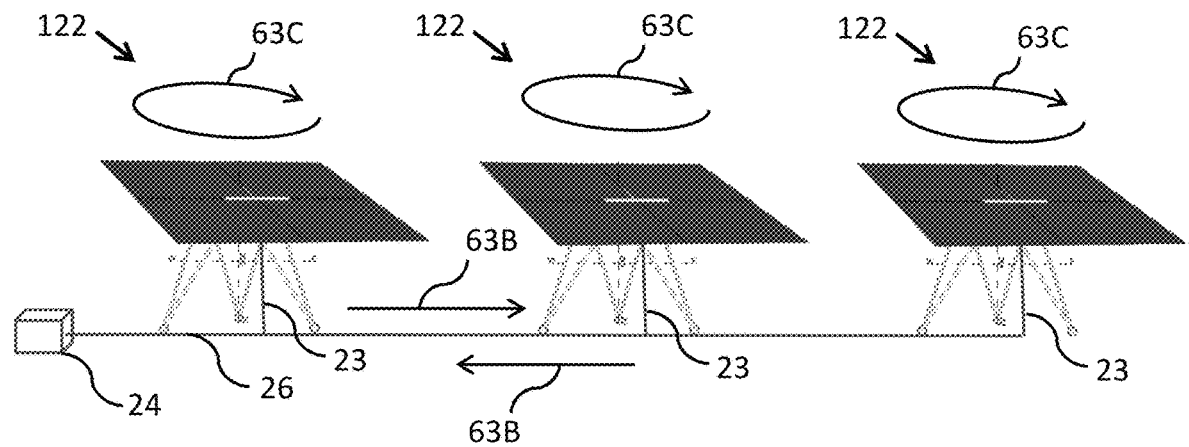
FIG. 8B is an isometric view of multiple mechanical solar trackers mechanically linked together.

FIG. 8B illustrates multiple mechanical solar trackers 122 mechanically linked together. In this embodiment, mechanical solar trackers 122 each have their individual elevation cams, such as inside elevation cam 30A shown in mechanical solar tracker 106 in FIG. 4. Elevation cams 30A provides the tilt input that determines the elevation angle for each of the mechanical solar trackers 122. The mechanical solar trackers 122 are ganged or coupled together with a linkage chain 26 and driven with a single rotation drive 24 and individual drive shafts 23. Linkage chain 26 forms a loop in rotation drive 24 and is linked to each drive shaft 23. The linkage chain 23 moves linearly along direction 63B to rotate the solar collectors (not labeled) from each of the mechanical solar trackers 122. Additionally, the linkage chain 23 and rotation drive 24 cause each of the mechanical solar trackers 122 to rotate a full revolution, illustrated by rotation movement 63C, for each 24-hour period. Each mechanical solar tracker 122 tracks the sun's location (e.g., its elevation) during daylight hours.

Rotation drive 24 may rotate many mechanical solar trackers, such as mechanical solar trackers 122, because the torque input to drive each mechanical solar tracker is relatively small due to the novel elevation cam design. While FIG. 8B shows only three mechanical solar trackers coupled together, many more mechanical solar trackers may be coupled together to a single rotation drive 24. Additionally, mechanical solar trackers 122 may be used to collect sunlight in a photovoltaic application or to reflect sunlight towards a predetermined location. In the latter application, each of the elevation cams in mechanical solar trackers 122 may have a slightly different shape depending on the solar tracker's location relative to the predetermined location.

Also in FIG. 8B, rotation drive 24 is illustrated as a separate drive unit from mechanical solar trackers 122. In other embodiments, rotation drive 24 may be part of one of the mechanical solar trackers 122, such as is illustrated in FIG. 1A with mechanical solar tracker 100. In this example embodiment, the drive shafts of each of the mechanical solar trackers may still be linked with a linkage chain 23 as described above.

Figure 8C:
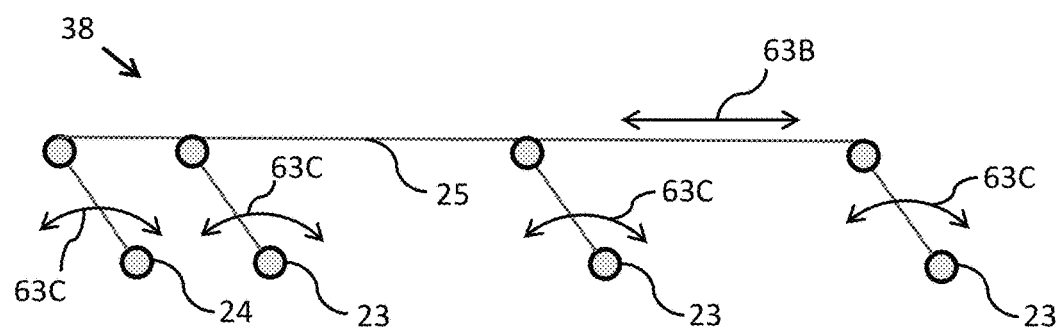
FIG. 8C is a plan view of a solar tracker mechanical-linking mechanism.

In another embodiment, FIG. 8C illustrates a plan view of various day-time only mechanical-linking mechanism 38. In this embodiment, a rotation drive 24 is rigidly coupled via linkage bar 25 to multiple drive shafts 23. Drive shafts 23 may be the same as those shown in mechanical solar trackers 108 in FIGS. 5A and 5B—each drive shaft 23 moves a day-only mechanical solar tracker. As illustrated in FIG. 8C, rotation drive 24 rotates back-and-forth with rotational movement 63C, causing linkage bar 25 to move back-and-forth with linear movement 63B, further causing each drive shaft 23 to move back-and-forth with rotational movement 63C.

Figure 9A:
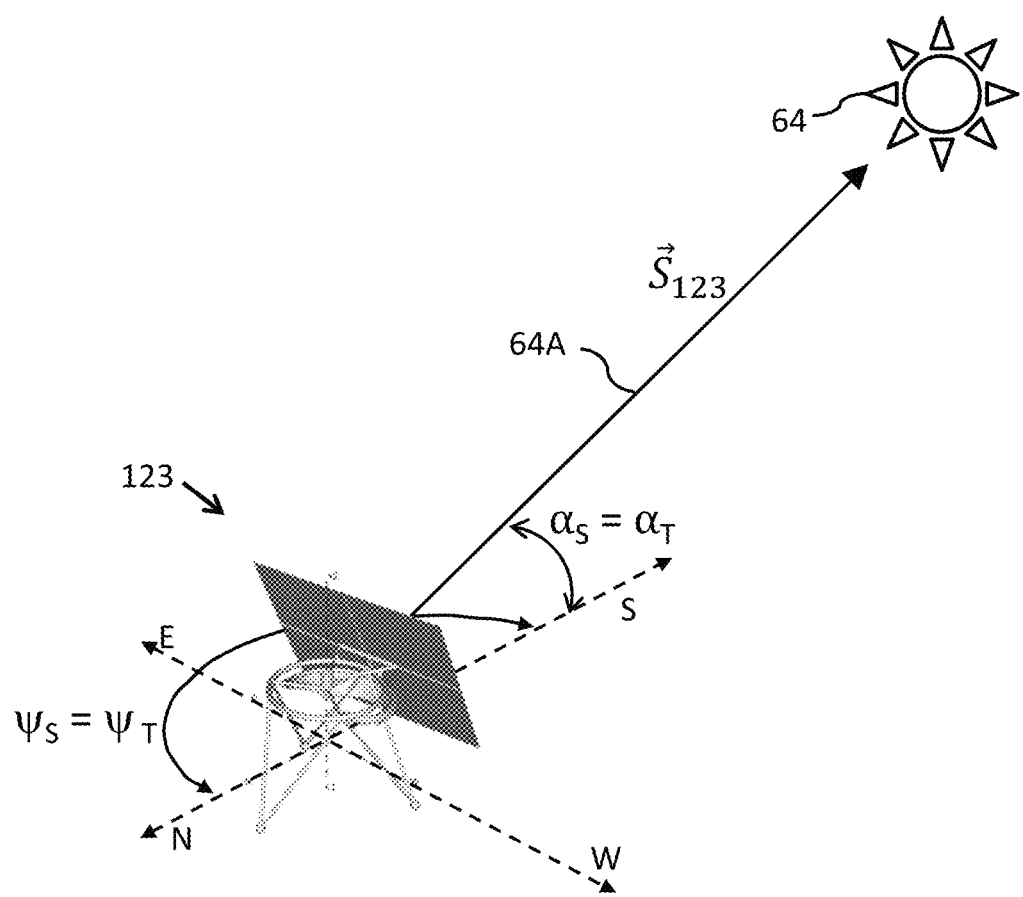
FIG. 9A is an isometric view of a mechanical solar tracker with its solar collector positioned orthogonal to the direction of the sun.

Defining the Elevation Angle $\alpha_T$ and Azimuth Angle $\psi_T$ of a Mechanical Solar Tracker To accurately track the location of the sun with a mechanical solar tracker, the sun's position must be determined for the latitude location of the mechanical solar tracker. FIG. 9A illustrates a vector $\vec{S}_{123}$ that points from the mechanical solar tracker 123 towards sun 64 in the sky, the direction of which may be defined by two angles, the azimuth angle $\psi_S$, which is the compass bearing, relative to true (geographic) north, of a point on the horizon directly beneath the sun, and the elevation angle $\alpha_S$, which is the angle between the sun 64 and the point on the horizon directly below the sun. FIG. 9A illustrates a mechanical solar tracker 123 pointing directly at the sun 64 with the sun's direction being directly south of the mechanical solar tracker 123.

Given the latitude location of the mechanical solar tracker or collector (lat) and the day of the year d, and the time of the day t, the position of the sun can be determined through algorithms. See Astronomical Algorithms, Jean H. Meeus, 1991. Online tools may also be used to provide the sun's position in terms of the azimuth and elevation angles. See, for example, www.sunearthtools.com. Commercial software may also be used to find the position of the sun. See, for example, the Astral Python software provided through https://pythonhosted.org/astral/. The position of the sun may be defined as Sun Direction:

$<\psi_S,\alpha_S>\leftarrow$Sun(lat,d,t)Sun Direction

The equation above may be reduced to a look-up table that plots $\psi_S$ and as $\alpha_S$ a function of lat, d, and t. Time, t, may be incremented in hours, minutes, or seconds, but preferably minutes. The more precise the time measurement, e.g., minutes instead of hours, the more precise a mechanical solar tracker may be in positioning its collector.

For optimal performance, a solar collector such as a photovoltaic or solar panel should be oriented with its surface normal to the sun's direction 64A. Thus, a mechanical solar tracker's orientation may be defined as the azimuth angle of a tracker $\psi_T$, which is also the rotation angle of the center point of the solar collector, together with the tilt angle of the solar collector with respect to the horizon, $\alpha_T$.

Fixing lat to the position of the mechanical solar tracker, the operation of a mechanical solar tracker may be defined as two functions that map the day d and the time t to the orientation of the collector $<\psi_T, \alpha_T>$.

$<\psi_T,\alpha_T> \leftarrow <\text{Track\_}\psi(d,t),\text{Track\_}\alpha(d,t)>\text{Track}$ Thus, for a mechanical solar tracker with a photovoltaic or solar panel, $\psi_T=\psi_S$ and $\alpha_T=\alpha_S$, as is illustrated in FIG. 9A.

Figure 9B:
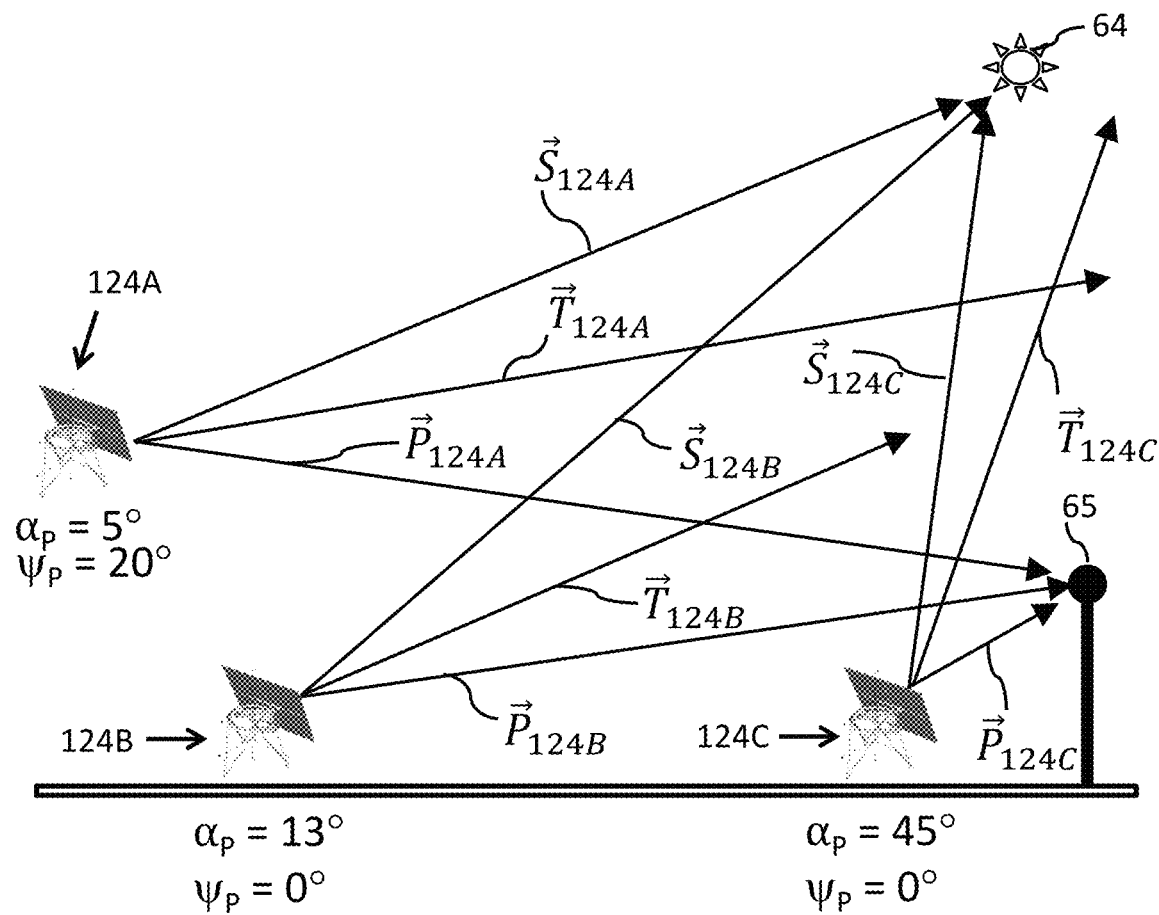
FIG. 9B illustrates multiple mechanical solar trackers reflecting sunlight towards a predetermined location.

The mechanical solar tracker azimuth angle $\psi_T$ and elevation angle $\alpha_T$ may be similarly defined for a mechanical solar tracker that reflects sunlight towards a target location or point, such as a tower or a town square. FIG. 9B illustrates various mechanical solar trackers 124A, 124B, and 124C reflecting sunlight towards a tower 65 (or predetermined location 65). A tower 65 may be a photovoltaic panel capable of receiving concentrated sunlight. Alternatively, a tower 65 may contain a thermal heat-sink that is used in a process to convert thermal energy to electrical energy. For example, the Ivanpah Solar Power Facility near Clark Mountain, Calif., uses thousands of solar reflectors to convert solar radiation to electrical energy. In another example, the solar reflectors near Rjukan, Norway reflect sunlight from the side of a mountain down towards the town square.

FIG. 9B illustrates three mechanical solar trackers 124A, 124B and 124C, reflecting sunlight to a tower or point 65. For each day of the year and each minute of the day, the azimuth angle $\psi_S$ and elevation angle $\alpha_S$ of the sun is determined and represented as a unit solar vector that points to the sun: $\vec{S}_{124A}$, $\vec{S}_{124B}$, and $\vec{S}_{124C}$. The value of azimuth angle $\psi_S$ and elevation angle $\alpha_S$ for each of $\vec{S}_{124A}$, $\vec{S}_{124B}$, and $\vec{S}_{124C}$ may be determined as function of lat, d, and t, as described above. For simplicity, $\psi_S$ and as are not labeled in FIG. 9B.

By way of example, in FIG. 9B, the three mechanical solar trackers 124A, 124B, and 124C are positioned at various locations relative to the tower 65. A mechanical solar tracker may be placed at any location suitable to reflect sunlight towards a tower or predetermined location. FIG. 9B further illustrates three unit pointing vectors, $\vec{P}_{124A}$, $\vec{P}_{124B}$, and $\vec{P}_{124C}$, pointing from each of the mechanical solar trackers 124A, 124B, and 124C towards a predetermined point or tower 64. The directional values of $\vec{P}_{124A}$, $\vec{P}_{124B}$, and $\vec{P}_{124C}$, or their azimuth angle $\psi_P$ and elevation angle $\alpha_P$ with respect to the tower or point 65, are labeled. For example, mechanical solar tracker 124A has an azimuth angle $\psi_P$ of 20 degrees and an elevation angle $\alpha_P$ of 5 degrees relative to the tower or point 65. The azimuth angle $\psi_P$ and elevation angle $\alpha_P$ are similarly labeled for mechanical solar trackers 124B and 124C. The directional values of $\vec{P}_{124A}$, $\vec{P}_{124B}$, and $\vec{P}_{124C}$ do not change because their location is fixed with respect to the tower 65.

To reflect sunlight towards the tower 65, the bisect point between the target or point 65 and the sun 64 becomes the unit tracking vector $\vec{T}$ for each of the mechanical solar trackers 124A, 124B, and 124C. Thus: $\vec{S}_{124A}+\vec{P}_{124A}=\vec{T}_{124A}$; $\vec{S}_{124B}+\vec{P}_{124B}=\vec{T}_{124B}$; and $\vec{S}_{124C}+\vec{P}_{124C}=\vec{T}_{124C}$. Describe differently, the values of the individual mechanical solar trackers' azimuth angle $\psi_T$ and elevation angle $\alpha_T$ are the sum of the directional values of $\vec{S}$ and $\vec{P}$. The resulting azimuth angle $\psi_T$ and elevation angle $\alpha_T$ are then used to determine the shape of the various elevation cams using the methods described herein.

Movement of an Individual Mechanical Solar Tracker

In embodiments, a mechanical solar tracker comprises an elevation cam. Example elevation cams illustrated and described herein include:

multi-day, 24-hour, inside-elevation cam 30A illustrated in FIG. 1A;

multi-day, 24-hour, outside-elevation cam 30B, illustrated in FIG. 1B;

multi-day, daylight-hour, inside-elevation cam 30C, illustrated in FIG. 2A;

multi-day, daylight-hour, outside-elevation cam 30D, illustrated in FIGS. 2B, 3A, 3B, and 3C;

multi-day, 24-hour, center-moving elevation cam 30E, illustrated in FIG. 4A;

multi-day, 24-hour, center-fixed elevation cam 30F, illustrated in FIG. 4B;

multi-day, daylight-hour, center-moving elevation cam 30G, illustrated in FIG. 5A;

multi-day, daylight-hour, center-fixed elevation cam 30H, illustrated in FIG. 5B;

single-day, 24-hour, inside-elevation cam 31A, illustrated in FIG. 6; and single-day, 24-hour, outside-elevation cam 31A, also illustrated in FIG. 6.

FIG. 10A illustrates an isometric view of an example multi-day, 24-hour, inside-elevation cam 30A, in relation to a ring 32, cam follower travel rod 46, and straight cam follower 57C. For purposes of this disclosure, elevation cam 30A is referred to as an "inside" elevation cam because the cam follower 57 is positioned within the ring 30. The north/south axis 62, east/west axis 61, and vertical axis 60 are also labeled to show the orientation of the inside-elevation cam 30A relative to the cardinal directions.

Figure 10B:
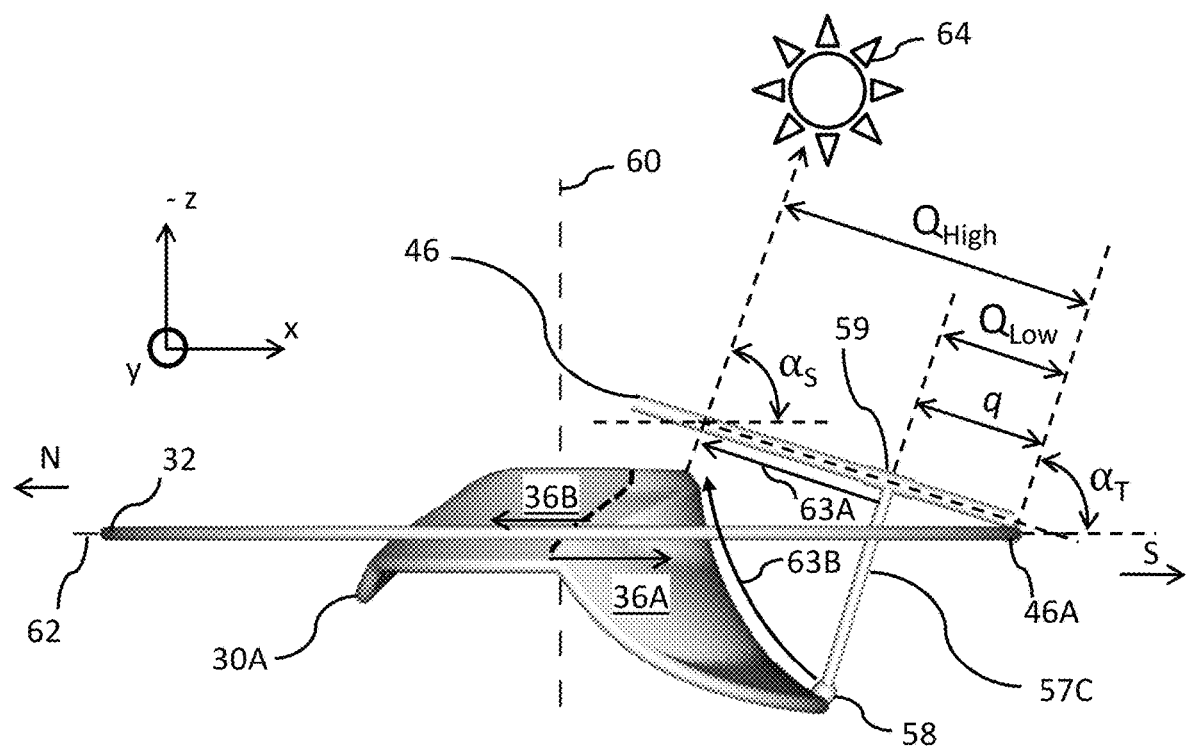

To simplify the illustration, several of the components of a collector assembly are not shown in FIG. 10A and other figures. For example, in embodiments, the cam follower travel rod 46 and the straight cam follower 57C, which are shown in FIGS. 10A and 10B, are only two parts of a complete collector assembly. Similarly, in FIG. 10A and other illustrations, the cam follower travel rod 46 runs parallel to a collector or reflector that would be attached to the cam follower travel rod 46. This is done to simplify the illustrations and a description of how to derive the surface shape of inside-elevation cam 30A. In practice, a cam follower travel rod (such as cam follower travel rod 46) need not be parallel to a collector or reflector surface but any difference in angle must be accounted for in the design of the elevation cam.

In embodiments, a collector (e.g., collector 44, not shown in FIG. 10A) is configured to point, by tracing the surface of the elevation cam (e.g., elevation cam 30A) with the cam follower (e.g., cam follower 57C and/or cam slider 58), the surface of the collector normal to the direction of the sun as the sun tracks across the sky for each day of a year and each time of the day. In FIG. 10A, the cam follower travel rod 46, representing one part of a complete collector assembly, rotates circumferentially around vertical axis 60 and along ring 32 to track the sun (not shown) as it appears to move from east to west across the sky each day. This motion is illustrated as motion arrow 63C. In the various figures, vertical axis 60 is an imaginary axis formed at the center of the mechanical solar tracker.

In embodiments, the elevation cam of a mechanical solar tracker includes both a daylight tracking surface and a night-time storage surface. In FIGS. 10A and 10B, the daylight tracking surface is labeled as 36A. Similarly, night-time storage surface is labeled as 36B. In these figures, a dashed line delineates the transition between surfaces 36A and 36B. In embodiments, a daylight tracking surface 36A and night-time storage surface 36B are configured such that the cam slider 58 traces each surface over a full 360-degree rotation during a 24-hour period. The design and shape of a daylight tracking surface 36A and a night-time storage surface 36B are described below.

FIG. 10B illustrates an elevation view of the elevation cam 30A shown in FIG. 10A with the same positions of the cam-follower travel rod 46 and straight-cam follower 57C relative to the elevation cam 30A. In this illustration, the sun's 64 elevation angle $\alpha_S$ is what it would be at 12:30 PM on June 20$^{th}$ in Logan, Utah. Also, in this illustration, cam-follower travel rod 46 is situated parallel to a radiation collector (not shown) and normal to the direction of the sun 64. In this illustration, and in embodiments, the sun's 64 elevation angle $\alpha_S$ is the same as the elevation angle $\alpha_T$ of the cam-follower travel rod 46 in relation to the horizon. The elevation angle $\alpha_T$ of the cam-follower travel rod 46 and the straight cam follower 57C relative to the inside elevation cam 30A is to point a radiation collector, represented by cam-follower travel rod 46, normal to the direction of the sun 64. This is similar to the embodiment shown in FIG. 9A.

The cam-follower travel rod 46 is configured to rotate about a horizontal plane at the cam-follower travel rod pivot point 46A. This rotation about pivot point 46A allows the cam-follower travel rod 46, or the radiation collector or reflector the cam-follower travel rod 46 is attached to, to track the elevation angle $\alpha_S$ of the sun's 64 direction as a function of the day and time. In the illustrated embodiments, and for clarity purposes, pivot point 46A is centered within the minor radius of ring 32, where ring 32 is illustrated as a toroid. In practice, the pivot point 46A may be positioned on the ring 32 such that its location is offset slightly from the minor radius of ring 32. For example, the pivot point 46A may be offset slightly above, outside, or below the right of the minor radius of ring 32. Any offset distance between the pivot point 46A and the ring 32 may need to be accounted for in the design of the elevation cam 32A surface. The pivot point 46A is usually a hinge (not shown) mounted to, for example, a collector carriage 50 shown in FIG. 1 or a turntable carriage 51 shown in FIG. 1B or 1C.

Like some other elevation cams disclosed herein, multi-day, 24-hour, inside-elevation cam 30A is configured for two, half-year operations. In FIGS. 10A and 10B, the straight cam follower 57C extends from the cam-follower travel rod 46 at the cam-follower travel rod sleeve 59 to the bottom of elevation cam 30A—this is the position of the straight cam follower 57C on a day at or near summer solstice. This position is labeled as $Q_{Low}$ in FIG. 10B. In this embodiment, $Q_{Low}$ is also the distance between the cam-follower travel rod pivot point 46A, or the cam-follower travel rod sleeve 59, and the lowest position of the straight cam follower 57C along the cam-follower travel rod 46.

For the first half-year operation, as the days of a year move away from the summer solstice towards the winter solstice, i.e., half of a year, the straight cam follower 57C is configured to move, via cam-follower travel rod sleeve 59, up the cam-follower travel rod 46 a distance q from $Q_{Low}$ towards $Q_{High}$. In FIGS. 10A and 10B, cam-follower travel rod movement 63A indicates movement of the cam follower 57C from $Q_{Low}$ towards $Q_{High}$. Cam-surface movement 63B indicates corresponding movement of cam slider 58 from the bottom of cam 30A towards the top of cam 30A. As the cam-follower travel rod sleeve 59 and straight cam follower 57C move up the cam follower travel rod 46, as indicated by direction arrow 63A, the cam slider 58 moves up the surface of inside-elevation cam 30A, as indicated by direction arrow 63B, and the cam-follower travel rod 46 pivots about the pivot point 46A to track the elevation angle $\alpha_T$ as the sun's position becomes lower in the sky. For the second half-year operation, once the cam follower 57C reaches the $Q_{High}$ position, cam-follower travel rod sleeve and cam follower 57C are configured to reverse directions and travel down the cam-follower travel rod 46 towards the $Q_{Low}$ position as the days of a year move away from the winter solstice towards the summer solstice, or the next half of the year. In this manner, the multi-day, 24-hour, inside-elevation cam 30A is configured for two, half-year operations, which combined, provide a full year of operation.

In other embodiments, an elevation cam may be configured to point a mechanical solar tracker towards the sun for a portion of the year but not the full year. For example, in extreme northern latitude locations, there is less benefit in tracking the sun during winter months because the amount of available daylight is much less. In embodiments, an elevation cam, or a mechanical solar tracker configured to operate in a northern latitude (e.g., above 45 degrees latitude) may only track the sun from February to November (e.g., February 1 to November 31) but not between November and February (e.g., November 31 to February 1).

In FIGS. 10A and 10B, the change in time between the straight cam follower 57C position at $Q_{Low}$ to $Q_{High}$ is 182 days, or half the year. Thus, the value q, which is a function of the day of the year, may be defined as:

$$q = Q_{Low} + (Q_{Low} + Q_{High}) * q' \qquad \text{Equation 1}$$

where q' is equal to:

$$q' = |d - 182|/182 \qquad \text{Equation 2}$$

and d is the number of days from the winter solstice, e.g., d=182 at the summer solstice. In other embodiments, an elevation cam surface may be operated for a full-year operation. In these embodiments, an elevation cam that is created to work for the whole year, as illustrated in 4A, the calculation of q' is adjusted as follows:

$$q' = d/365 \qquad \text{Equation 3}$$

Mechanical Solar Tracker Design Parameters

Figure 10C:
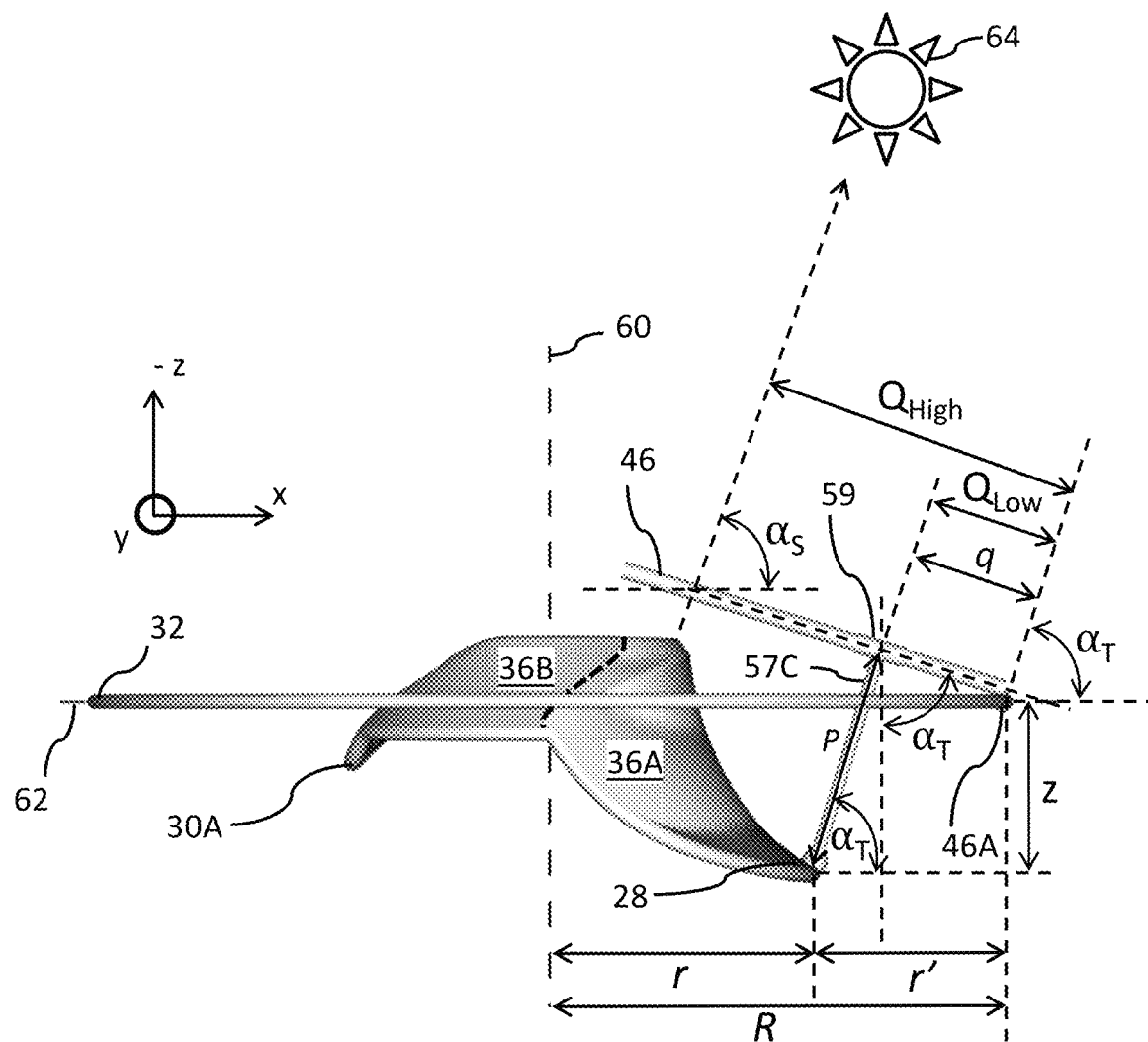

A mechanical solar tracker, such as mechanical solar trackers 100-124 illustrated in various figures, and other mechanical solar trackers disclosed herein, includes several design parameters that should be specified before the surface shape of an elevation cam, such as inside elevation cam 30A, may be defined. These design parameters are illustrated in FIG. 10C as:

ring 32 radius, R;
straight cam follower 57C length, P;
minimum straight cam follower 57C travel distance, $Q_{Low}$; and
maximum straight cam follower 57C travel distance, $Q_{High}$.

These design parameters are a function of the size, shape, and weight of a collector or reflector supported by the ring 32 or a collector assembly (not shown) that is supported by the ring 32.

The size or radius of the ring 32 influences the size of elevation cam 30. As described in more detail below, a larger-radius ring will, in turn, make for a larger elevation cam 30A. In embodiments, the ring 32 may support the weight of the collector carriage, for example, collector carriage 50 shown in FIG. 1A. A larger-area collector may require a larger-diameter ring 32 due to weight considerations or potential movement interference between parts of the mechanical solar tracker. In embodiments, ring 32 may be replaced with a rotation ring or turntable bearing, for example, rotation ring or turntable bearing 33 (also known as a Lazy Susan) shown in FIGS. 1B and 1C. The size or radius of a turntable bearing 33 influences the size of an elevation cam (such as elevation cam 30A) in the same way the radius of a ring 32 influences the size of elevation cam 30A.

The values of $Q_{Low}$ and $Q_{High}$ also influence the size of the elevation cam 30A. In this embodiment, $Q_{Low}$ is the distance between the pivot point 46A and the position of the straight cam follower 57C at the summer solstice. $Q_{High}$ is the distance between $Q_{Low}$ and the position of the straight cam follower 57C at the winter solstice, plus the value of $Q_{Low}$. Generally speaking, the larger the value of $Q_{High}$, the larger the ring 32 and the elevation cam 30A.

Determining the Surface Shape of an Elevation Cam

Movement of a collector carriage (such as collector carriage 50 shown in FIG. 1A) or a turntable carriage (such as turntable carriage 51 shown in FIGS. 1B and 1C) is encoded into the surface of the elevation cam (such as elevation cams 30A, 30B, 30C, 30D, etc. shown in various figures). The surface of the elevation cam is a function of the latitude location of the mechanical solar tracker.

In prior-art solar trackers, the activation and control to change the orientation of a solar tracker is implemented through computer control and electromagnetic actuation. Since both $\psi_T$ and $\alpha_T$ need to be controlled, two independent control and actuation circuits are needed. In contrast, embodiments of the present invention disclosed herein eliminate the need to actively control and actuate the elevation angle $\alpha_T$ through the use of a cam surface.

Figure 10D:
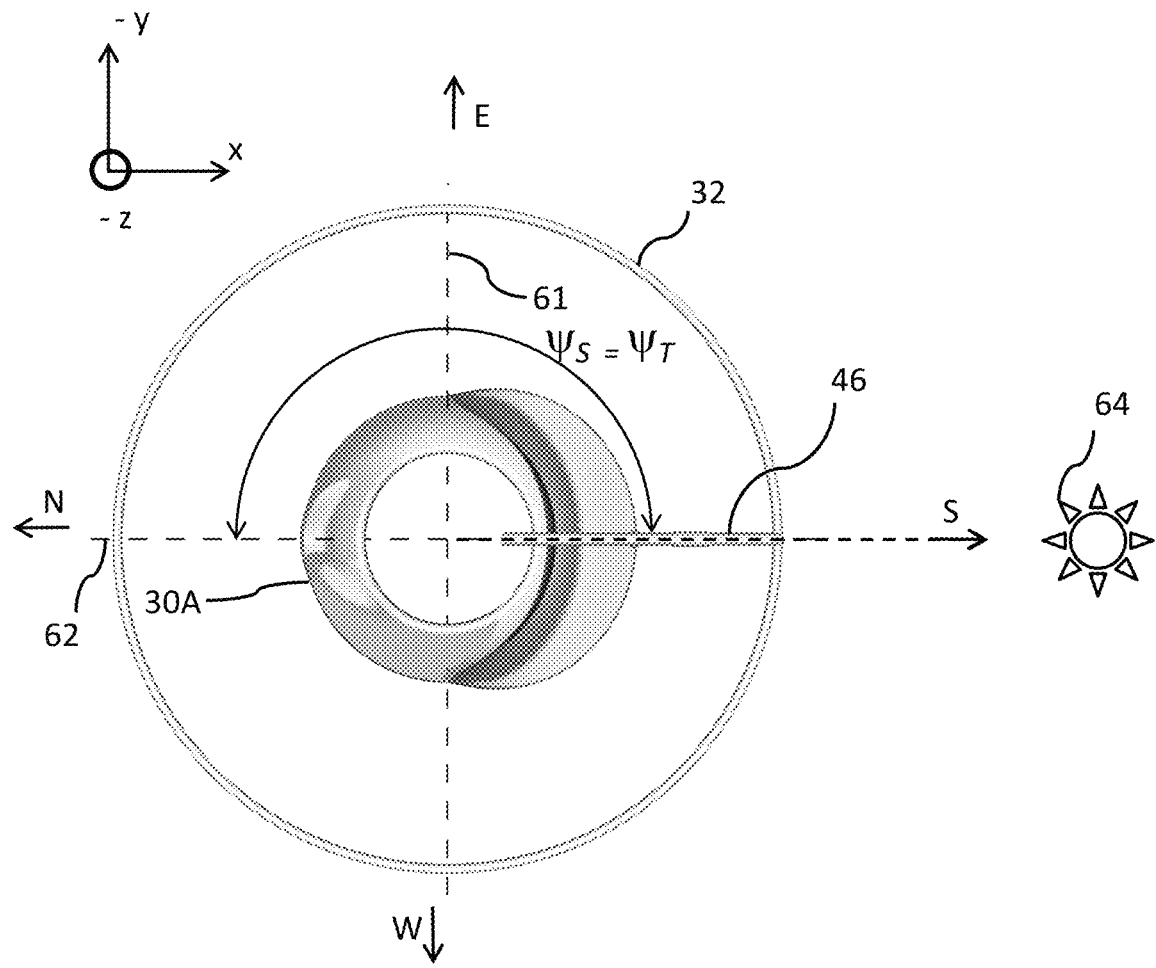

Referring now to FIGS. 10C and 10D, the daylight tracking surface of multi-day, 24-hour, inside elevation cam 30A may be defined as a function of the azimuth angle of a tracker $\psi_T$ (shown in FIG. 10D) and the tilt angle of the cam follower travel rod 46 with respect to the horizon, $\alpha_T$. The elevation cam 30A surface may be defined as surface points in the Cartesian coordinate system of x, y, and z, where x is the distance extending from the imaginary vertical axis 60 towards the south, y is the distance extending from the imaginary vertical axis 60 towards the west, and z is the vertical distance from a horizontal plane located at the pivot point 46A.

The cam surface is constructed for a given latitude lat by iterating through each day of the year d and for each time of each day t, usually in minutes. For the case of an inside cam, as illustrated in FIG. 10C, the surface point 28 is also a function of engineering parameters $Q_{Low}$, $Q_{High}$, R, and P. The calculation that determines the point on the cam surface may be described using computer language notation as a function with inputs lat, d, t, $Q_{Low}$, $Q_{High}$, R, and P, and output <x, y, z> representing the Cartesian coordinates of the cam point 28. Let this function be:

$<x,y,z> \leftarrow$ CamPoint_Inside(lat,$d,t,Q_{Low},Q_{High},R,P$).

First, the target azimuth $\psi_T$ and the target elevation angle $\alpha_T$ is obtained through sun-positioning software, given the fixed latitude location of the mechanical solar tracker, lat.

$<\psi_T,\alpha_T> \leftarrow$ Sun(lat,$d,t$)

Then q is computed according to equations 1 and 2:

$q=Q_{Low}+(Q_{Low}+Q_{High})*q'$  Equation 1 where $q'$ is equal to:

$q'=|d-182|/182$  Equation 2 and d is the number of days from a designated day, in this case the winter solstice, e.g., d=182 at the summer solstice.

Then, the points on the elevation cam 30A surface are directly computed using the trigonometry detailed in FIG. 10C, where:

$x=r*\cos(\psi_T)$ $y=r*\sin(\psi_T)$; and $z=q*\cos(\alpha_T)-P*\sin(\alpha_T)$, where:

$r=R-r'$, and $r'=q*\sin(\alpha_T)+P*\cos(\alpha_T)$.

The collection of Cartesian coordinates created from each day of the year and each time (e.g., minute) of each day, x, y, and z, form a three-dimensional surface that may then be manufactured using a 3D-printer, injection molding, machine press, a pressed wire-mesh surface, CNC, or other techniques as the elevation cam 30A surface.

A multi-day, 24-hour, inside-elevation cam 30A embodiment requires the specification of elevation angle values for times during the night for each day of the year. In FIGS. 10A-10D, the daylight tracking surface is labeled as 36A and the night-time storage surface is labeled as 36B. To determine the surface shape of the night-time storage surface 36B of elevation cam 30A, a set of target elevation angles for every minute of every night may be specified. The function specification may be chosen to satisfy engineering requirements, such as desired angles for stowing, maintenance, and minimum wind load of a collector carriage on the ring 32 and frame 20. Based on the engineering requirements, specific target elevation angles may be provided to the CamPoint_Inside function. The resulting trajectory will be a sequence of azimuth $\psi_T$ and tilt $\alpha_T$ angles that smoothly links from the azimuth $\psi_T$ and tilt $\alpha_T$ angles at sunset to the azimuth $\psi_T$ and tilt $\alpha_T$ angles at sunrise for each operational night of the year. To ensure smoothness and minimize an angular rate of change, spline functions may be employed. Algorithms for producing splines are described by Ahlberg. See Ahlberg, J. Harold; Nielson, Edwin N.; Walsh, Joseph L. (1967). The Theory of Splines and Their Applications. New York: Academic Press. ISBN 0-12-044750-9.

Figure 11A:
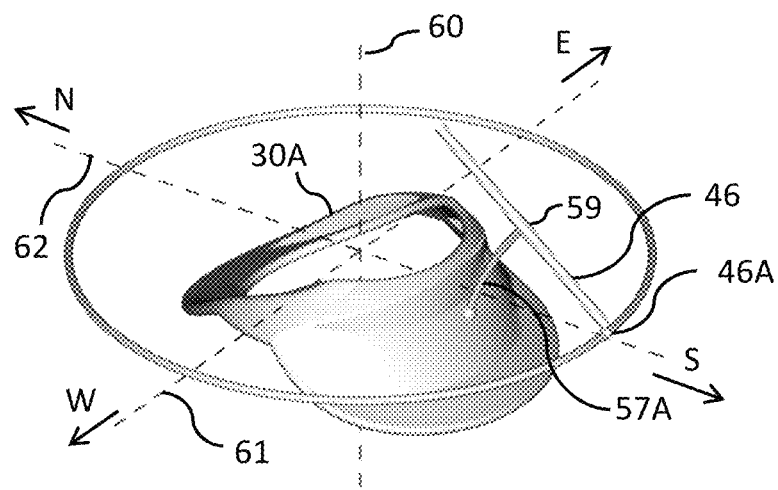
FIGS. 11A and 11B illustrate portions of another mechanical solar tracker containing an outside-elevation cam.
Figure 11B:
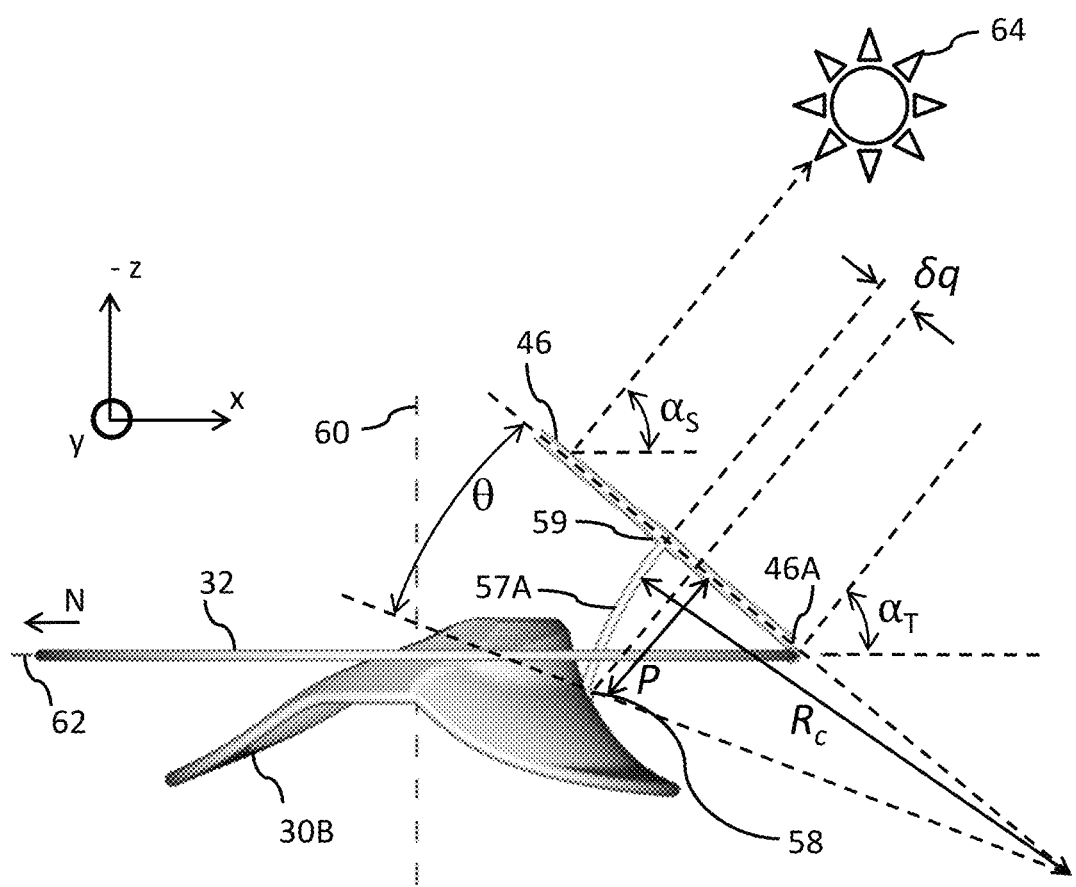

FIGS. 11A and 11B are isometric views of another example multi-day, 24-hour, inside-elevation cam 30A. The only difference between this device and the one illustrated in FIGS. 10A and 10B is the replacement of the straight cam follower 57C with a curved cam follower 57A. Cam followers may take many shapes, so long as they connect the cam slider 58 to the cam follower travel rod sleeve 59. Shapes may be determined to avoid interference, or to shift the travel range of the cam follower travel rod sleeve 59 along cam follower travel rod 46. In this example embodiment, the radius of curvature of curved-cam follower 57A is an arc of a circle.

FIG. 11B illustrates the engineering parameters needed to specify the arc-shaped cam follower 57A. These include the radius of the arc, $R_c$, and the sweep angle, $\theta$. For context, the cam follower travel rod 46, the pivot point 46A, the cam slider 58 and the ring 32 are labeled. To determine the cam point for the curved cam follower 57A, the same method developed for the straight cam 57C is used. A supplementary function is required that determines the equivalent P-value from $R_c$ and $\theta$. In addition, some offset needs to be applied to the q-value of the straight-cam follower to determine the value of the q in the arc-shaped cam follower 57A. Let this offset be $\delta q$, then:

$$P=R_c*\sin(\theta), \text{ and}$$

$$\delta q=Rc*(\cos(\theta)-1).$$

Figure 12A:
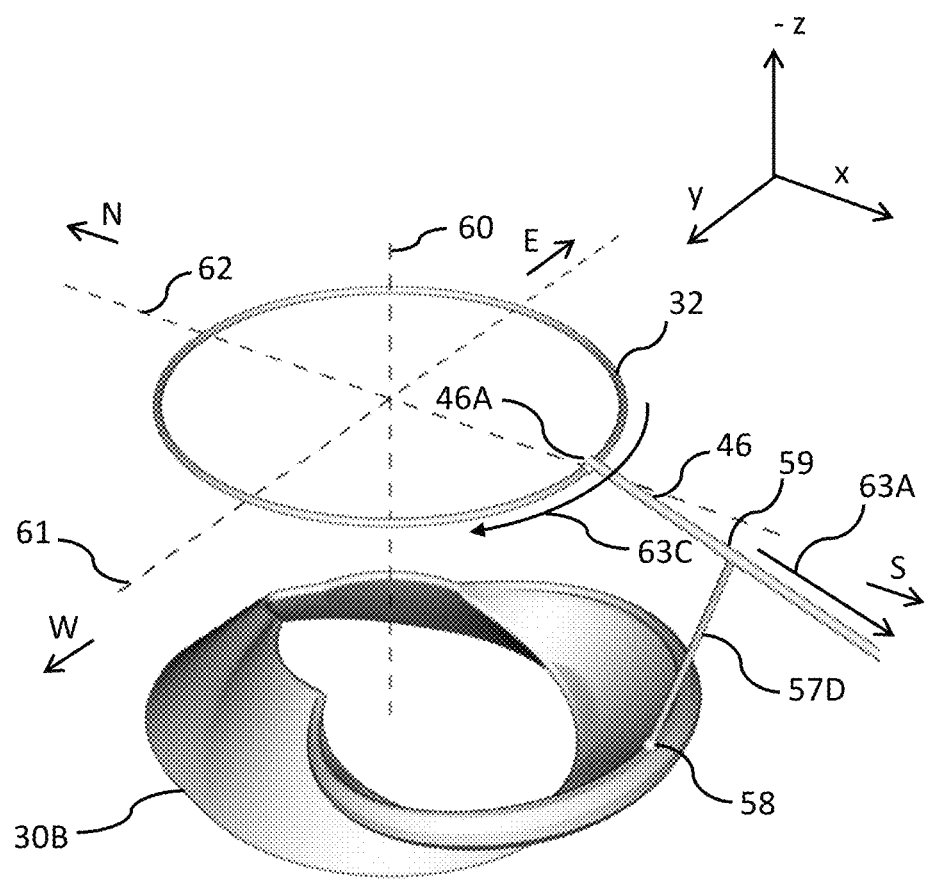
FIGS. 12A, 12B, and 12C illustrate portions of a mechanical solar tracker containing an outside-elevation cam.
Figure 12B:
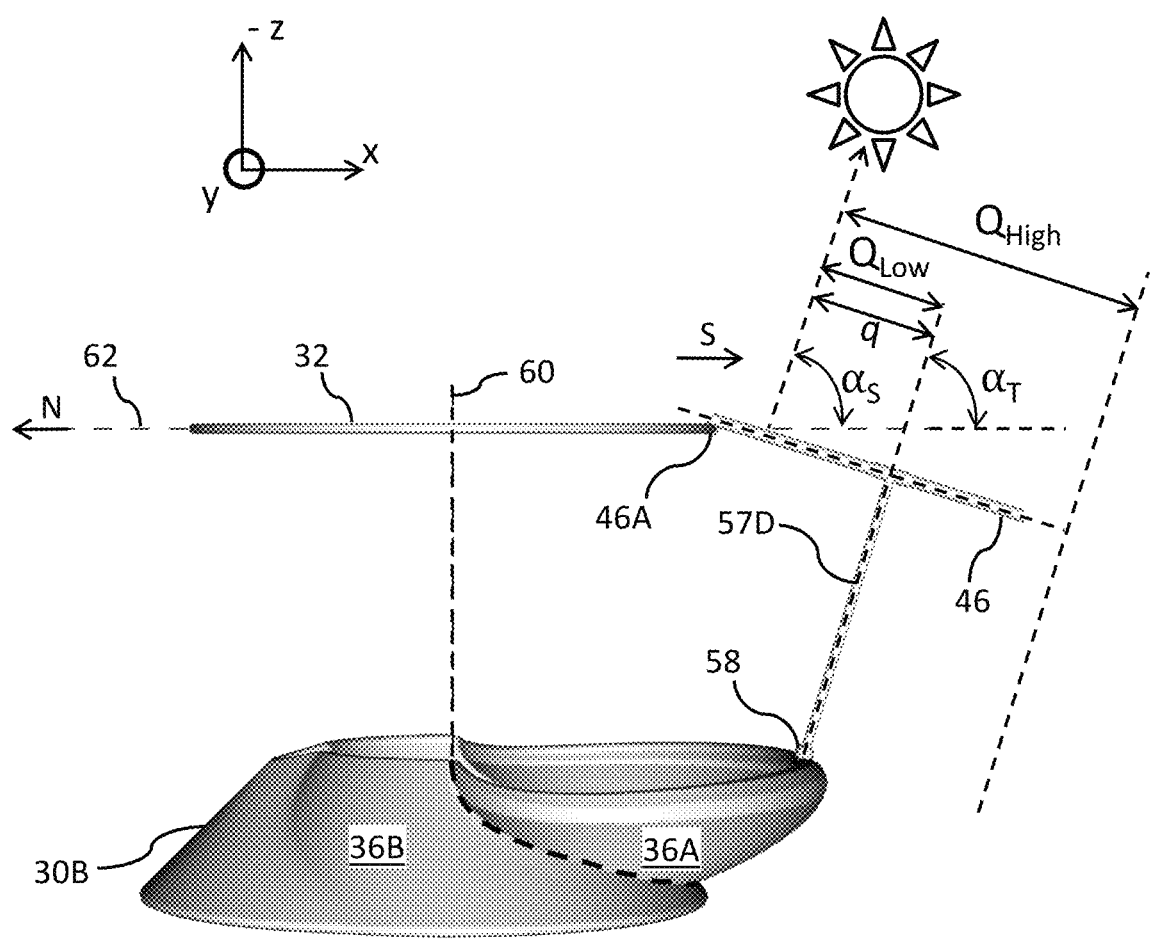

FIGS. 12A-12D illustrate various isometric views of a multi-day, 24-hour, outside-elevation cam 30B with a straight cam follower 57D. The elevation cam 30B is referred to as "outside" because the cam follower 57D is positioned outside of the ring 32. FIGS. 12A and 12B include only those components needed to specify how the elevation angle $\alpha_T$ of the mechanical solar tracker is set by the mechanical interaction with the elevation cam 30B. Cam-follower travel rod 46 and cam-follower travel rod sleeve 59 rotate circumferentially around axis 60 in direction 63A, from east to west. The cam-follower travel rod 46 connects to the horizontal stabilizing rod (not shown) at the pivot point 46A on the ring 32. The straight cam follower 57D moves along the cam-follower travel rod 46 in cam-follower travel rod movement 63A according to the day of the year, moving the cam slider 58 onto a different path on the surface of elevation cam 30B as shown in cam-follower travel rod movement 63A.

FIG. 12B illustrates a side view of the elevation cam 30B shown in FIG. 12A with the same positions of the cam-follower travel rod 46 and straight cam follower 57D. In this illustration, the sun's 64 elevation angle $\alpha_S$ is what it would be at 12:30 PM on June 20$^{th}$ in Logan, Utah. Also, in this illustration, cam-follower travel rod 46 is situated parallel to a radiation collector (not shown) and normal to the direction of the sun 64. In this illustration, and in embodiments, the sun's 64 elevation angle $\alpha_S$ is the same as the elevation angle $\alpha_T$ of the cam-follower travel rod 46 in relation to the horizon. The elevation angle $\alpha_T$ of the cam-follower travel rod 46 and the straight cam follower 57D relative to the outside-elevation cam 30B is to point a radiation collector, represented by cam-follower travel rod 46, normal to the direction of the sun 64.

Figure 12C:
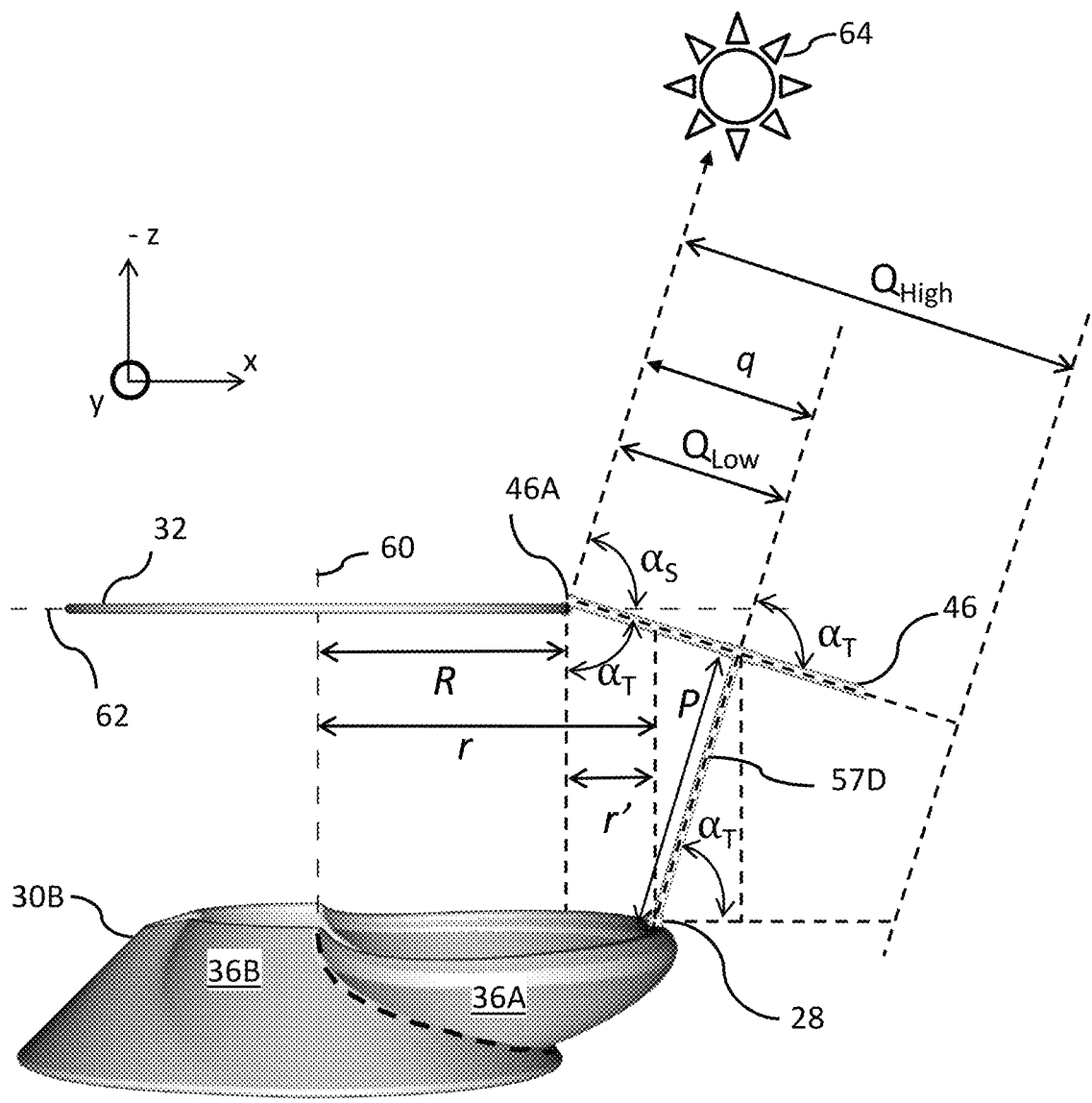

As the days of a year move away from the summer solstice towards the winter solstice, cam-follower travel rod sleeve 59 and straight cam follower 57D are configured to move along the cam-follower travel rod 46 a distance q from $Q_{Low}$ towards $Q_{High}$ in a similar way described for the inside cam given in FIGS. 10A and 10B. FIG. 12C denotes design parameters including the radius of the ring 32, R, the length of the straight cam follower 57D, P, and the range of the sliding motion of the cam arm 57D, $Q_{High}$ and $Q_{Low}$. Also noted are two intermediate variables r and r' that are used to calculate Cartesian coordinates x, y, and z on the surface of cam outside-elevation cam 30B.

The cam surface is constructed for a given latitude lat by iterating through each day of the year d and for each time of each day t. For the case of an outside cam, as illustrated in FIG. 12C, a surface point 28, described below as Cartesian coordinates x, y, and z, is also a function of engineering parameters $Q_{Low}$, $Q_{High}$, R, and P. The calculation that determines the point 28 on the cam surface may be described using computer language notation as a function with inputs lat, d, t, $Q_{Low}$, $Q_{High}$, R and P, and output <x, y, z> representing the Cartesian coordinates of a cam point 28. Let this function be:

$$<x,y,z>\leftarrow\text{CamPoint\_Outside}(\text{lat},d,t,Q_{Low},Q_{High},R,P)$$

First, during the daytime, the target azimuth $\psi_T$ and the target elevation angle $\alpha_T$ are obtained through sun-positioning software, given the fixed latitude location of the mechanical solar tracker, lat. If the cam is 24-hour, then during night time the target values of X, $\alpha_T$ are determined by the process described herein, where:

$$<\psi_T,\alpha_T>\leftarrow\text{Sun}(\text{lat},d,t)$$

Then q is computed according to equations 1 and 2:

$$q=Q_{Low}+(Q_{Low}+Q_{High})*q' \quad\quad \text{Equation 1}$$

where q' is equal to:

$$q'=|d-182|/182 \quad\quad \text{Equation 2}$$

and d is the number of days from the winter solstice, e.g., d=182 at the summer solstice.

Then, the points are directly computed using trigonometry illustrated in FIG. 10C, where:

$$x=r*\cos(\psi_T)$$

$$y=r*\sin(\psi_T); \text{ and}$$

$$z=-q*\cos(\alpha_T)-P*\sin(\alpha_T),$$

where:

$$r=R+r', \text{ and } r'=q*\sin(\alpha_T)-P*\cos(\alpha_T).$$

The collection of Cartesian coordinates created from each day of the year and each minute of each day, x, y, and z, form a three-dimensional surface that may then be manufactured using a 3D-printer, injection molding, machine press, a pressed wire-mesh surface CNC, or other techniques as the tracking surface of the outside elevation cam 30B.

In FIGS. 12A-12C, and in other embodiments illustrated herein, cam slider 58 is not permanently attached to the surface of elevation cam 30B. This allows cam slider 58 to slide along the surface of elevation cam surface 30B. In addition, cam slider 58 may move from and return to the surface of elevation cam 30B. This may occur, for example, if a collector is subjected to a large wind force that moves the collector (not shown), the cam-follower travel rod 46, the cam-follower travel rod sleeve 59, and the cam slider 58 away from the surface of the elevation cam 30B. In such an occurrence, a mechanical solar tracker may be configured to relocated the cam slider 58 and attached components to the surface of elevation cam 30B after the disturbance. Upon return of the cam slider 58 to the surface of elevation cam 30B, the mechanical solar tracker will still accurately position of the collector in the correct orientation.

FIGS. 13A-13D illustrate various isometric views of mechanical solar tracker 112, or portions of mechanical solar tracker 112. Mechanical solar tracker 112 includes a multi-day, 24-hour, fixed, center-elevation cam 30F with a straight cam follower 57F. The elevation cam 30F is referred to as "center" because the cam follower 57F rotates about the center of the mechanical solar tracker 112 or about the vertical axis 60. In this embodiment of mechanical solar tracker 112, the elevation cam 30F is fixed, meaning it does not move up or down relative to pole 22, or rotate relative to the Cardinal axes. Elevation cam 30F may be supported by the ground or a fixed center pole 22, or fixed to a support frame 20 or tripod frame 21. For clarity purposes, this support is not shown.

Figure 13A:
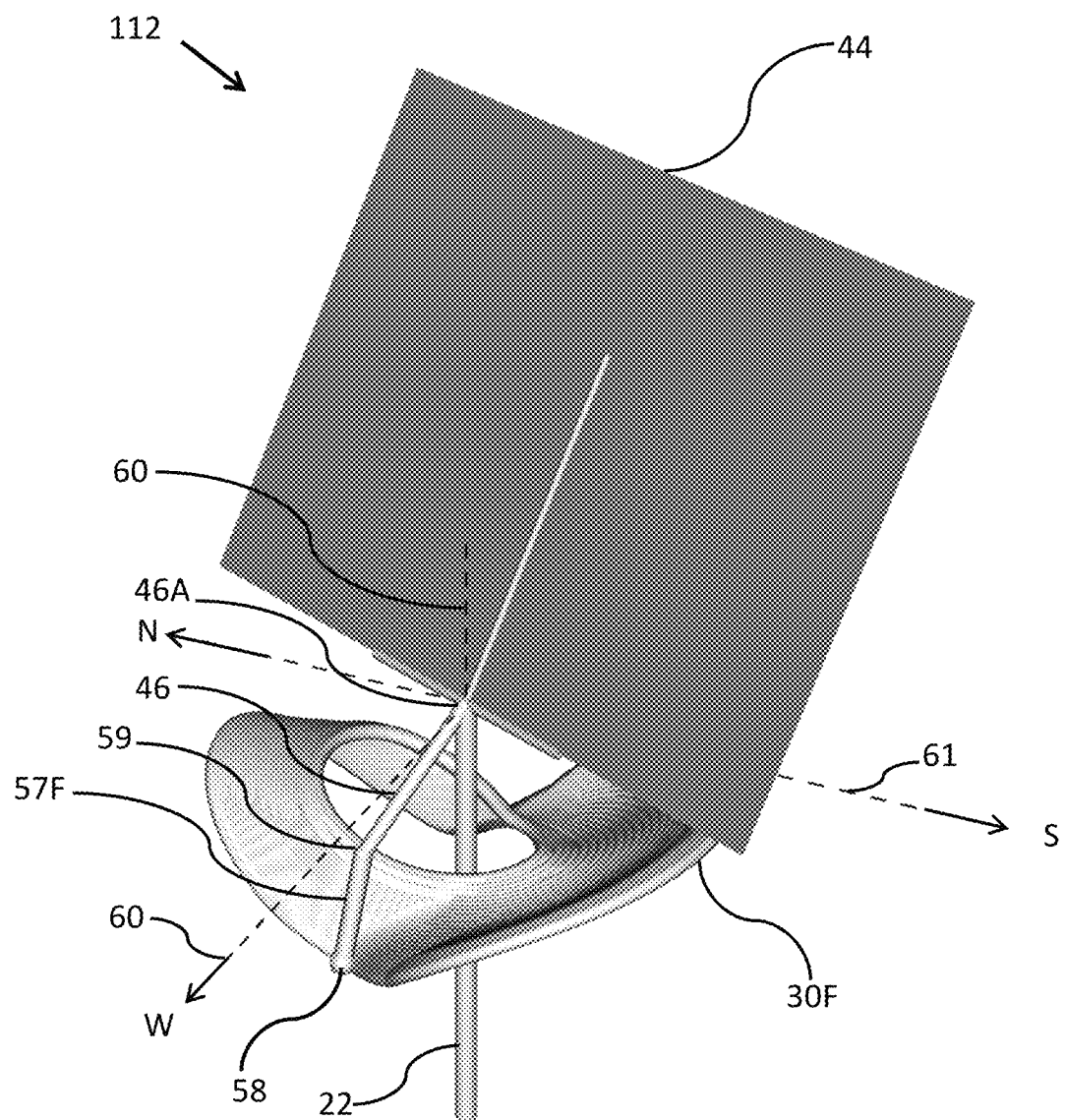
FIGS. 13A, 13B, 13C, and 13D illustrate portions of a mechanical solar tracker containing a fixed-center elevation cam.
Figure 13B:
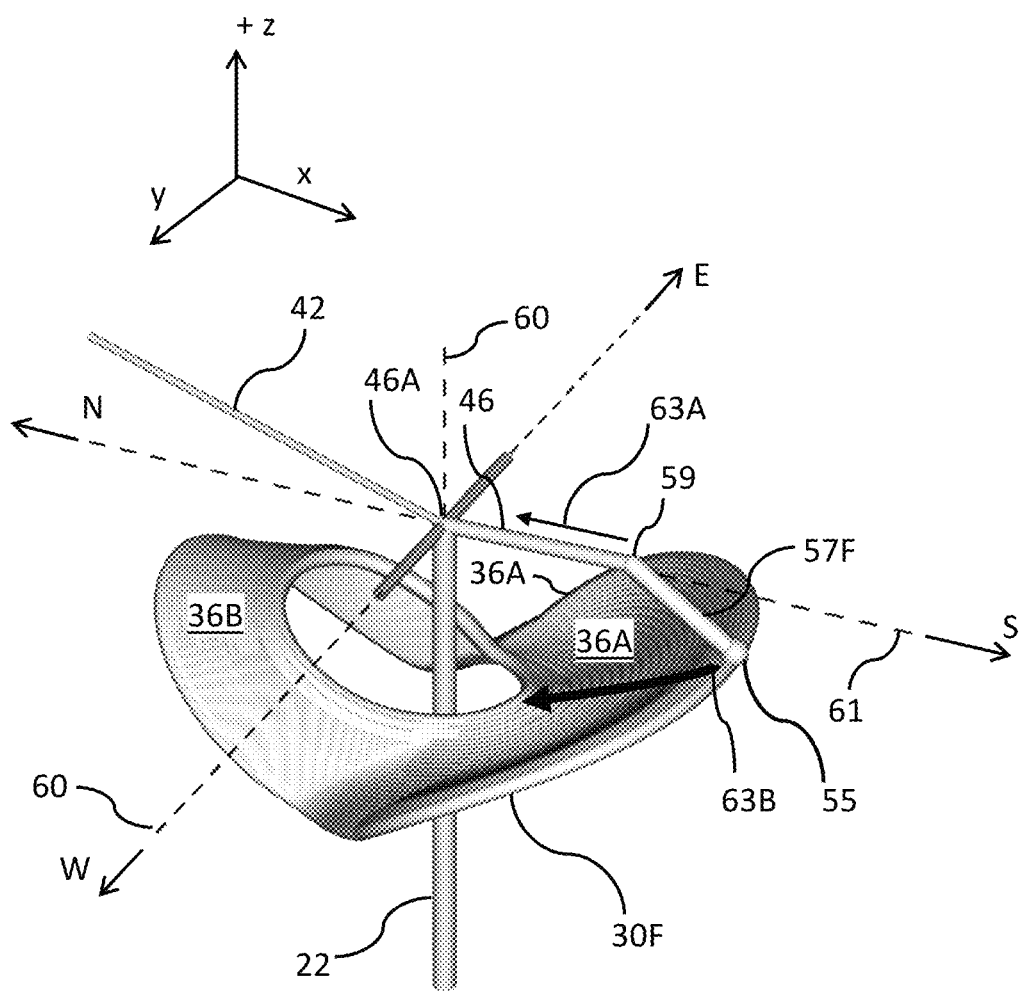

FIGS. 13A and 13B show the cam slider 58 in contact with the center cam 30F at the end of the straight-cam follower 57F. In FIG. 13B, the cam follower 57F connects to the cam follower travel rod sleeve 59, which moves along the cam-follower travel rod 46 with movement 63A as the days progress from summer solstice to winter solstice. Correspondingly, cam slider 58 moves along cam-surface movement 63B as cam follower 57F moves along the cam-follower travel rod 46.

In FIG. 13B, the cam follower 57F is fully extended at the end of cam-follower travel rod 46 as it would be on summer solstice. In this embodiment, the cam follower 57F does not connect orthogonally with cam-follower travel rod 46. Instead, cam follower 57F is oriented at an angle relative to cam-follower travel rod 46. Also, in this embodiment, cam-follower travel rod 46 does not run parallel to the collector 44 as a cam-follower travel rod may do in other mechanical solar tracker embodiments. Instead, the orientation of the cam follower 57F relative to the cam-follower travel rod 46 helps to avoid interference between the cam follower 57F and the elevation cam 30F during the mechanical solar tracker's 112 winter operation when the cam follower 57F is moved along cam-follower travel rod movement 63A.

Figure 13C:
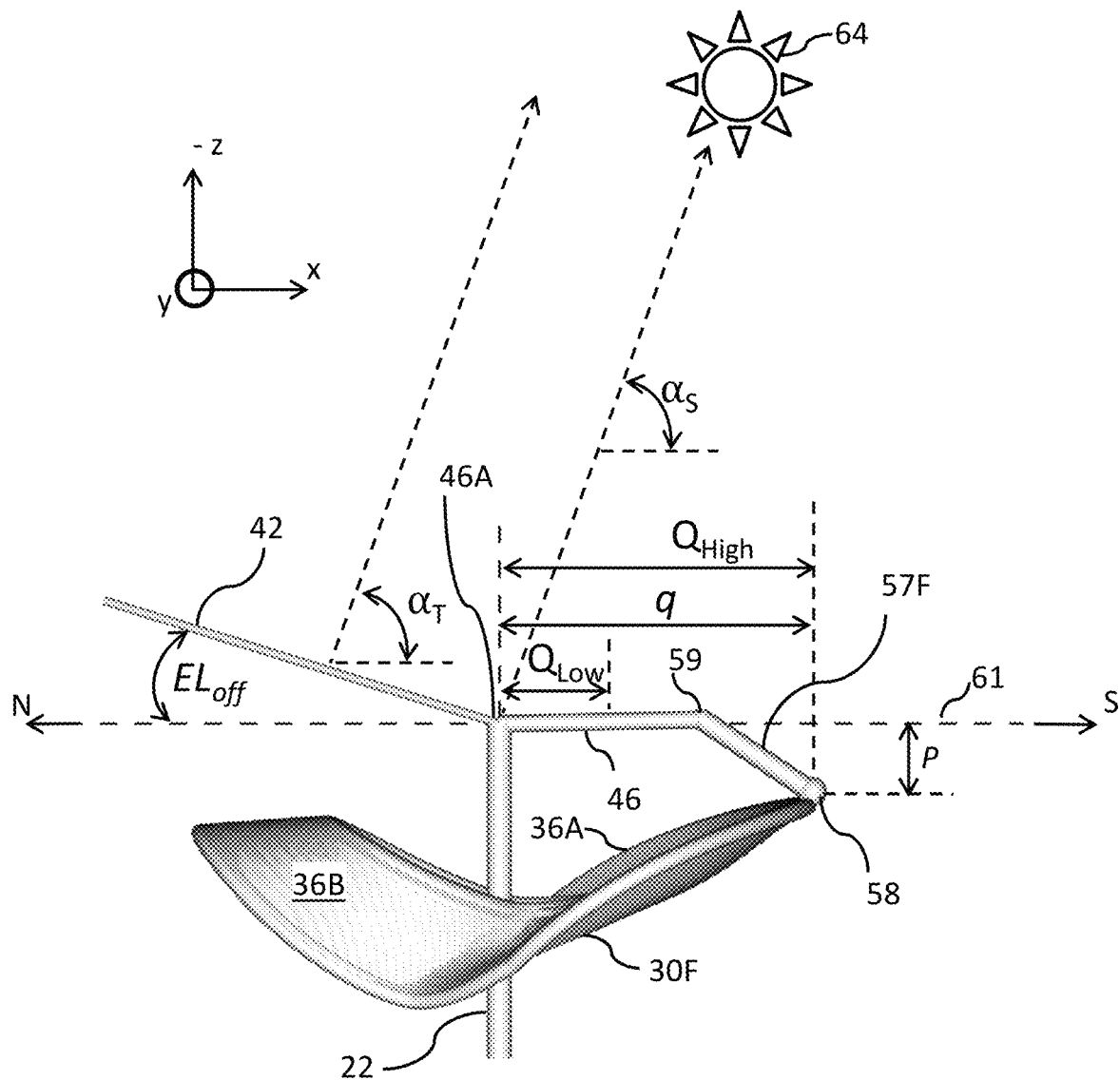

FIG. 13C illustrates a portion of the mechanical solar tracker 112 illustrated in FIGS. 13A and 13B. FIG. 13C does not show the collector 44 but its position and orientation would be parallel to tipper rod 42. In FIG. 13C, the sun's 64 elevation angle $\alpha_S$ is what it would be at 12:30 PM on June 20$^{th}$ in Logan, Utah. On this day, the cam follower 57F is at its furthest distance from pivot point 46A along cam-follower travel rod 46.

Figure 13D:
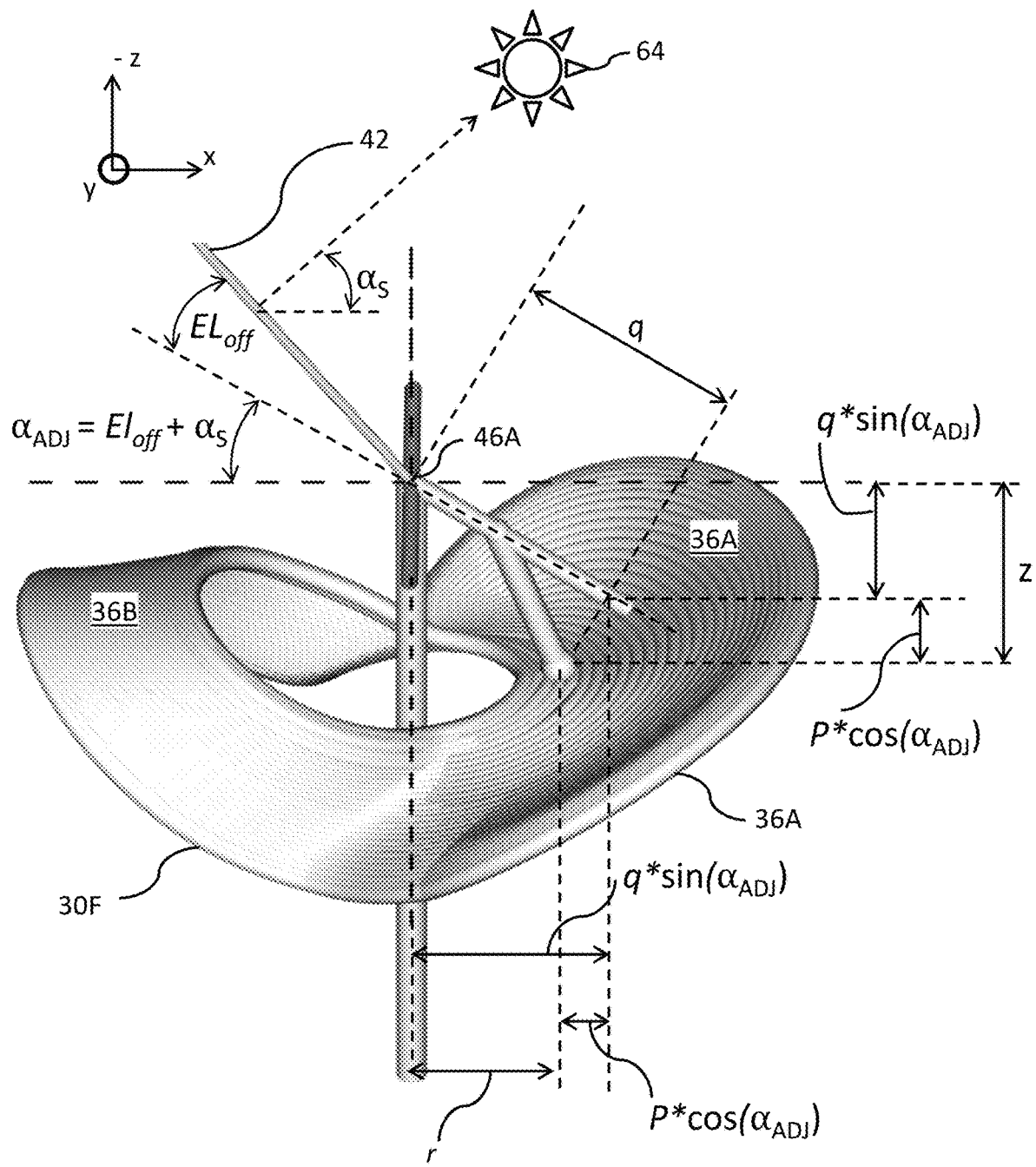

FIG. 13C illustrates an elevation view of the elevation cam 30F shown in FIG. 13A with the same positions of the tipper rod 42 and straight cam follower 57F relative to the elevation cam 30F. Note that the tipper rod 42 is connected to a radiation collector (not shown) and normal to the direction of the sun 64 at an elevation angle $\alpha_T$. There is a fixed offset angle between the tipper rod 42 and the cam-follower travel rod 46 denoted as an elevation offset angle, $EL_{off}$. As the days of a year move away from the summer solstice towards the winter solstice, the straight-cam follower 57F is configured to move, via cam-follower travel rod sleeve up the cam-follower travel rod 46 a distance q from $Q_{Low}$ towards $Q_{High}$. This is similar to the motion of straight-cam follower 57C described in FIGS. 10A and 10B. FIG. 13C shows what the position of the cam follower 57F would be at summer solstice, while FIG. 13D shows what the position of cam follower 57F would be on the 10$^{th}$ of October. FIG. 13C denotes the design parameter P, which is the perpendicular distance between the cam-follower travel rod 46 and the cam slider 58. FIG. 13C also shows the elevation offset $EL_{off}$ is the offset angle between the cam-follower travel rod 46 and the tipper rod 42. Also shown are the design parameters $Q_{High}$ and $Q_{Low}$ that specify the range of motion of the cam slider 57D along the cam-follower travel rod 46.

The daytime tracking surface 36A of multi-day, 24-hour, center-fixed elevation cam 30F may be derived for a given latitude lat by iterating through each day of the year, d, and for each time of each day, t. In this example, as illustrated in FIG. 13D, the Cartesian coordinates x, y, and z, of the daylight tracker surface 36A is a function of engineering parameters $Q_{Low}$, $Q_{High}$, $EL_{off}$ and P. The calculation that determines the Cartesian coordinates x, y, and z, on the daylight tracker surface 36A may be described using computer language notation as a function with inputs lat, d, t, $Q_{Low}$, $Q_{High}$, $EL_{off}$ and P, and output <x, y, z> representing the Cartesian coordinates of any point on the daylight tracker surface 36A. Let this function be:

$$<x,y,z> \leftarrow \text{CamPoint\_Center}(lat,d,t,Q_{Low},Q_{High},EL_{off},P)$$

First, during daylight the target azimuth $\psi_T$ and the target elevation angle $\alpha_T$ is obtained through sun-positioning software, given the fixed latitude location of the mechanical solar tracker, lat, where:

$$<\psi_T,\alpha_T> \leftarrow \text{Sun}(lat,d,t)$$

If the cam is 24-hour, then during night time the target values of $\psi_T$, $\alpha_T$ are determined by the process described herein.

Then, q is computed according to equations 1 and 2:

$$q = Q_{Low} + (Q_{Low} + Q_{High})*q' \quad \text{Equation 1}$$

where q' is equal to:

$$q' = |d - 182|/182 \quad \text{Equation 2}$$

and d is the number of days from the winter solstice, e.g., d=182 at the summer solstice.

Additionally, $\alpha_{ADJ} = EL_{off} + \alpha_S$. Then:

$$x = r*\cos(\psi_T);$$

$$y = r*\sin(\psi_T); \text{ and}$$

$$z = q*\sin(\alpha_{ADJ}) + P*\cos(\alpha_{ADJ}),$$

where:

$$r = q*\sin(\alpha_{ADJ}) - P*\cos(\alpha_{ADJ}).$$

The collection of Cartesian coordinates created from each day of the year and each minute of each day, x, y, and z, form a three-dimensional surface that may then be manufactured using a 3D-printer, injection molding, machine press, a pressed wire-mesh surface CNC, or other techniques as the tracking surface 36A of multi-day, 24-hour, center-fixed elevation cam 30B.

Figure 14A:
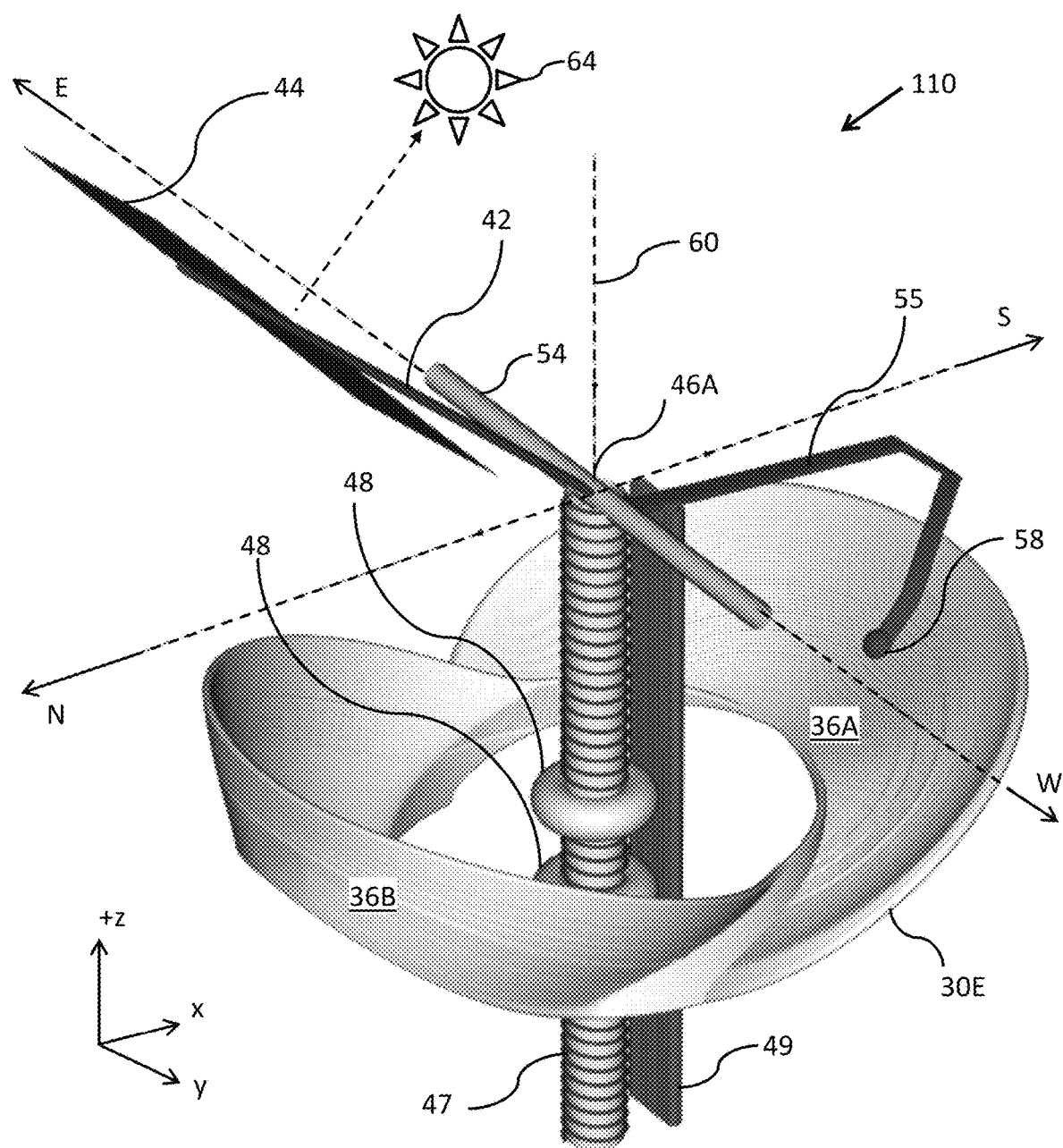
FIGS. 14A and 14B illustrate portions of a mechanical solar tracker containing a moving-center elevation cam.

FIGS. 14A-14G illustrate various isometric views of a mechanical solar tracker 110. Mechanical solar tracker 110 is an example mechanical solar tracker configured for a latitude location of Logan, Utah. Mechanical solar tracker 110 includes a multi-day, 24-hour, center-moving, elevation-cam 30E with a tipper arm 52. The elevation cam 30E is referred to as "center-moving" because, in operation, elevation cam 30E moves up and down drive screw 47 via cam nuts 48 to implement day-to-day or seasonal adjustment. In FIG. 14A, elevation cam 30E is illustrated without any central support, or connections to cam nuts 48, so as not to obscure the view of cam nuts 48.

Figure 14B:
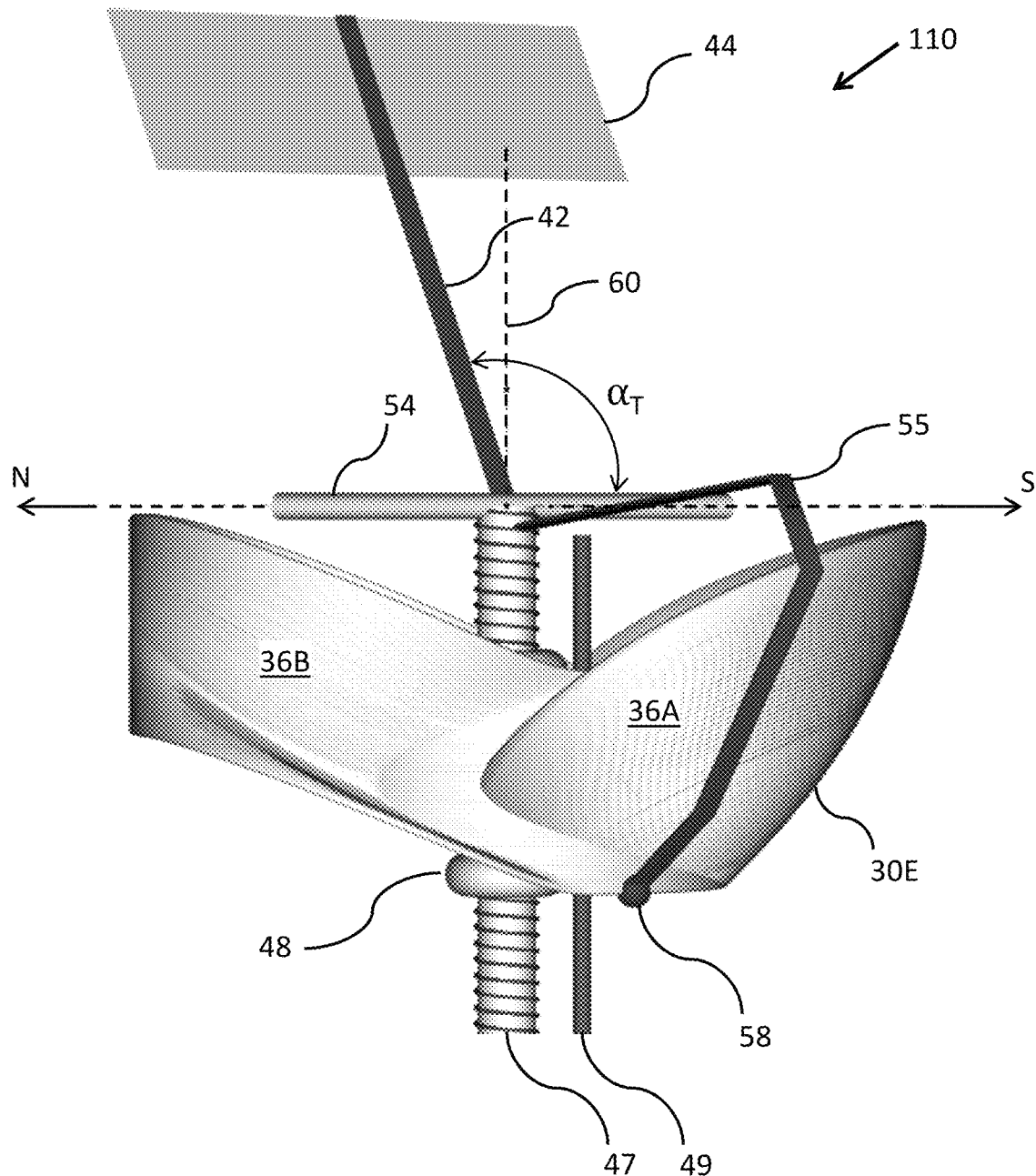

In FIG. 14A, the daylight-tracking surface 36A and the nighttime-storage surface 36B are illustrated with the solar collector facing the sun 64 at noon on September 9$^{th}$ in Logan, Utah. In this embodiment, elevation cam 30E is configured for operation from summer solstice, June 21$^{st}$, to winter solstice, December 21$^{st}$. FIG. 14B illustrates a side view of mechanical solar tracker 110. In this illustration, the collector 44 is positioned at a stow position following sunset on December 21$^{st}$.

Mechanical solar tracker 110 also includes a cam slider 58, which is connected to a tipper-cam, follower-arm 55, and tipper-rod 42. Tipper rod 42 is connected to a collector 44. In this embodiment, there is a rigid connection between the cam slider 58 and the collector 44. In the FIG. 14A illustration, solar collector 44 is shown as being very small so as not to obscure the view of other components of mechanical solar tracker 110.

Mechanical solar tracker 110 also includes a cam slider 58. The cam slider 58 traces the surface of elevation-cam 30E and is connected to the tipper-cam, follower-arm 55, tipper-rod 42, and solar collector 44 to set the elevation angle $\alpha_T$ of mechanical solar tracker 110.

The solar collector 44, tipper rod 42, and tipper-cam, follower-arm 55 rotate relative to an imaginary horizontal plan (not labeled) about the pivot point 46A. The imaginary horizontal plane may be imagined as a plane formed by the N, S, E, and W cardinal directions or arrows illustrated in FIG. 14A. The rotation about the imaginary horizontal axis of the solar collector 44, and other parts connected to the solar collector 44, positions the solar collector 44 normal to the sun's 64 direction according to the sun's elevation angle $\alpha_S$.

Similarly, in this embodiment, the pivot point 46A, solar collector 44, tipper rod 42, and tipper-cam, follower-arm 55 are rigidly attached to each other and hingedly coupled to horizontal stabilizing rod 54 and to the drive screw 47. The drive screw 47, and other attached parts, rotate 360 degrees about the imaginary vertical axis 60 to implement azimuth tracking during daylight time according to the sun's 64 azimuth angle $\psi_S$, and nighttime storage during non-daylight hours. Thus, the drive screw 47 movement provides both the elevation angle $\alpha_T$ tracking and the azimuth angle $\psi_T$ tracking of the mechanical solar tracker 110.

In this embodiment, elevation-cam 30E interfaces with drive screw 47 via cam nuts 48. In other embodiments of a mechanical solar tracker containing a multi-day, 24-hour, center-moving elevation-cam 30E, at least one cam nut 48 is rigidly connected to the elevation-cam 30E and threaded onto the drive screw 47. In this embodiment, the cam nuts 48 are fixed to center-moving cam 30E with support structure not shown in FIG. 14A.

Mechanical solar tracker 110 also includes a cam keeper 49. The cam keeper 49 is a vertical rod or plate fixed to the support structure or ground (not shown). Cam keeper 49 keeps elevation-cam 30E fixed relative to the Cardinal axes and prevents elevation cam 30E from rotating with the drive screw 47. Cam keeper 49 may be rigidly connected to the support structure but allow the elevation-cam 30E to move up and down on the drive screw 47. Elevation cam 30E may slide vertically on the cam keeper 49. In embodiments, cam keeper 49 acts through a vertical slot formed in elevation cam 30E.

Figure 14C:
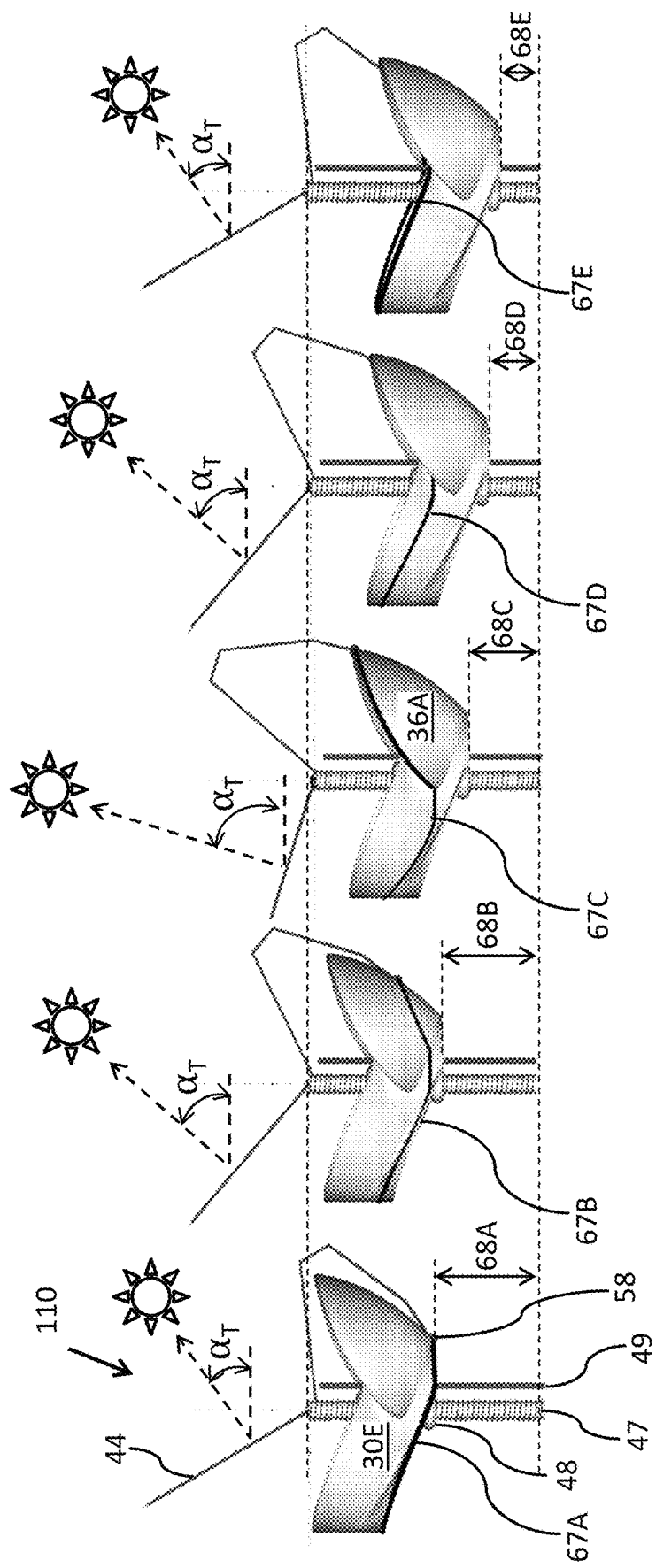
FIG. 14C illustrates various orientations of the mechanical solar cam shown in FIGS. 14A and 14B as it would appear during different days of the year.

FIG. 14C illustrates five side-by-side views of center-moving, elevation cam 30E and other components of mechanical solar tracker 110 for five different days of the year. For clarity purposes, parts of mechanical solar tracker 110 are labeled only in the left-most sub-figure of FIG. 14C. The view of some of the components is obscured and therefore not labeled. Additionally, for comparison purposes, the solar collector 44 and corresponding parts of mechanical solar tracker 110 are positioned at solar noon (e.g., at the same time of day) for the five days illustrated.

Each of the sub-illustrations in FIG. 14C compare how the center-moving, elevation cam 30E, together with cam nuts 48 and drive screw 47, implement day-to-day or seasonal adjustment of mechanical solar tracker 110. Each sub-illustration displays the path of cam slider 58 on elevation cam 30E as a thick-black line, labeled: 67A, 67B, 67C, 67D, and 67E. In the left-most sub-figure, the first operational day of the year is February $1^{st}$, illustrated as path 67A, when cam 30E is positioned at its highest vertical point on the drive screw 47. In this sub-illustration, the height position of cam 30E on drive screw 47 is labeled as height 68A.

In operation, as the drive screw 47 rotates solar collector 44 a full rotation each 24-hour period and the cam nuts 48 move a vertical distance determined by the thread count of drive screw 47. For example, the cam nuts 48 are secured to elevation cam 30E such that elevation cam 30E moves to a lower position as the cam nuts 48 move down drive screw 48. Additionally, cam keeper 49 prevents elevation cam 30E from rotating with the drive screw 47.

Each of the sub-illustrations in FIG. 14C show the relative position of elevation cam 30E on different example days of the year and the path of cam slider 58 on elevation cam 30E for those days. For example, path 67B represents the path the path cam slider 58 takes on March $3^{rd}$. Additionally, path 67C is the path for June $21^{st}$, path 67D is the path for September $9^{th}$, and path 67E is the path for November 16.

Each of sub-illustrations in FIG. 14C also shows the relative height of elevation cam 30E for the five different days. For example, elevation cam 30E is at height 68B on March $3^{rd}$, height 68C on June $21^{st}$, height 68D on September $9^{th}$, and height 68E on November $16^{th}$. On the last operational day of November $16^{th}$, cam 30E is at its lowest vertical height 68E.

Between February $1^{st}$ to June $21^{st}$, the cam slider 58 traces paths on the outside of elevation cam 30E. From June $22^{nd}$ until November $16^{th}$, the cam slider 58 traces paths on the inside of elevation cam 30E during daylight operation. In this embodiment, between November $16^{th}$ and February $1^{st}$, the mechanical solar tracker 110 does not track the sun. Sometime between November $16^{th}$ and February $1^{st}$, the cam slider 58 needs to be "reset" for operation by the next February $1^{st}$.

Figure 14D:
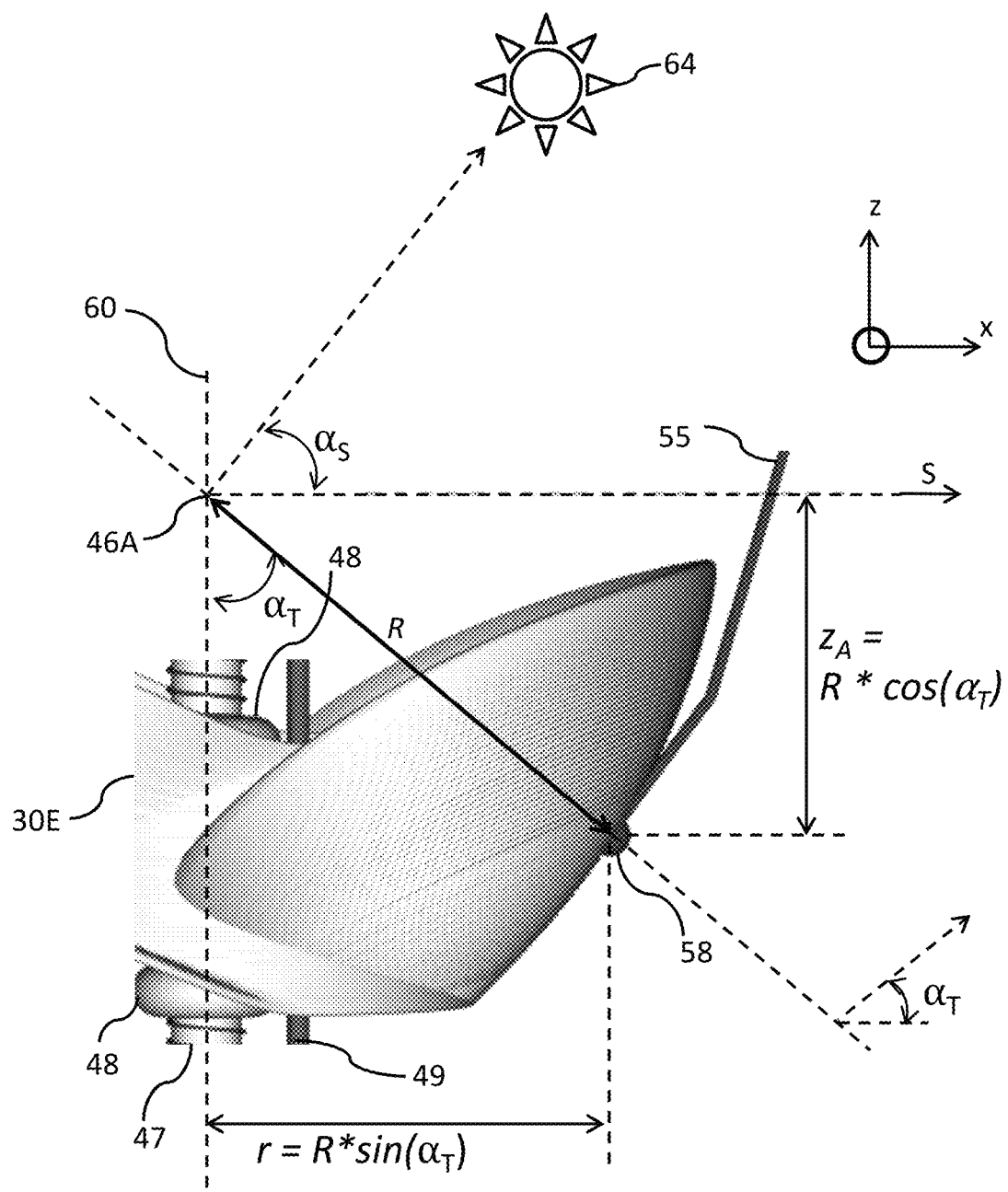
FIGS. 14D and 14E illustrate more detailed portions of the mechanical solar tracker shown in FIGS. 14A and 14B.
Figure 14E:
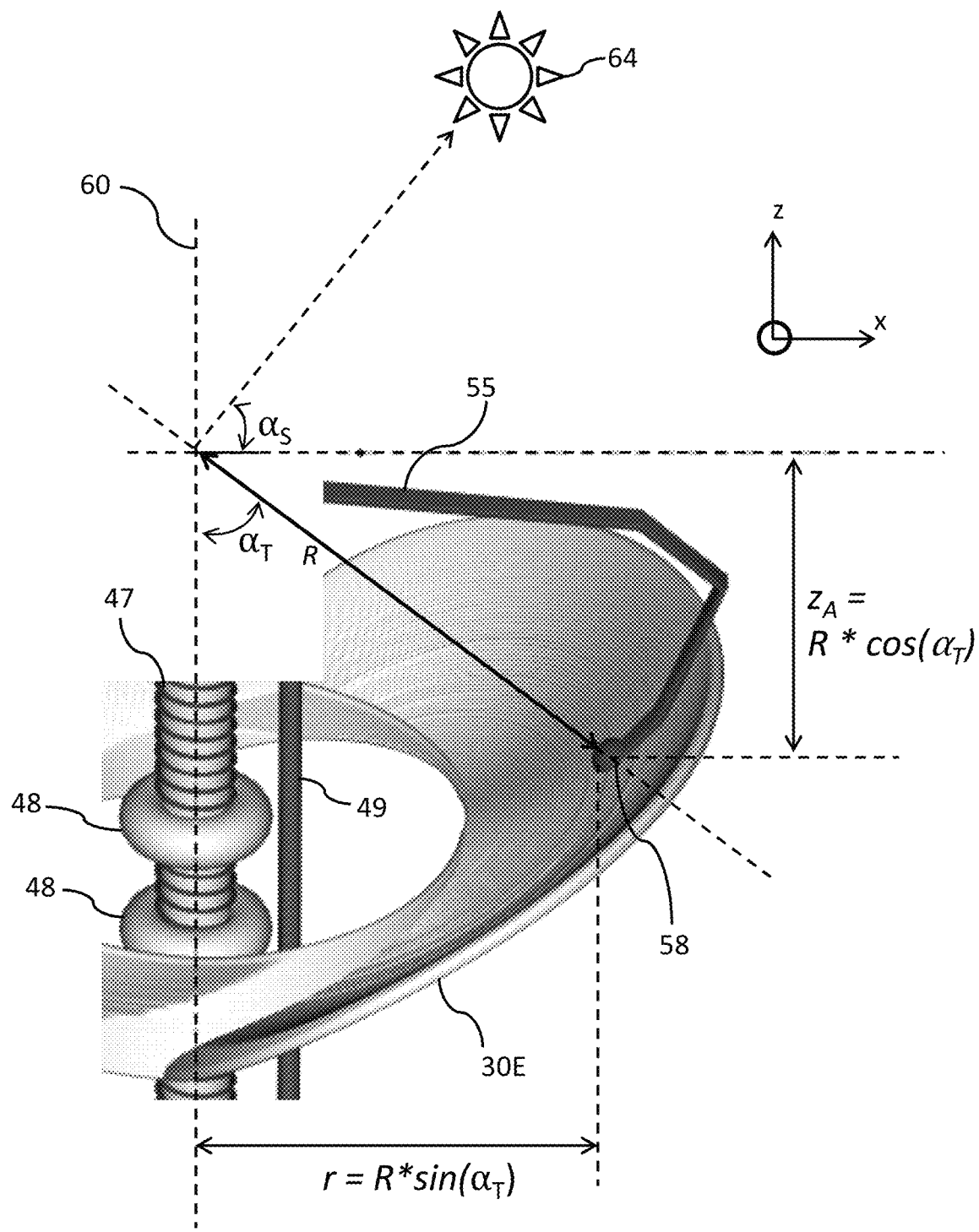

As in other embodiments, the surface of elevation cam 30E may be derived for a given latitude lat by iterating through each day of the year d and for each time of each day, t. For the case of center-moving cam 30E, as illustrated in FIG. 14D through FIG. 14E, the surface of elevation cam 30E is a function of an engineering parameter, radius R (shown in FIGS. 14D and 14E). Radius R is the distance from the pivot point 46A to the contact point between the cam slider 58 and the surface of moving center cam 30E. FIG. 14D illustrates a side view of cam 30E as it would be positioned at solar noon on March $3^{rd}$ while FIG. 14E illustrates an oblique view of cam 30E as it would be positions at solar noon on September $9^{th}$. In both figures, the drive screw 47, the cam nuts 48, cam slider 58, and the cam keeper 49 are illustrated for context.

The surface of elevation cam 30E may be described using computer language notation as a function with inputs lat, d, t, $Q_{High}$, R, and output <x, y, z> representing the Cartesian coordinates of a point on the surface of elevation cam 30E. FIG. 14D illustrates the engineering parameter, radius R. The engineering parameter $Q_{High}$, defines the range of elevation cam 30E on the drive screw 47 as the difference between the z-measurement 68E and 68A in FIG. 14C. Let this function be:

$$<x,y,z> \leftarrow \text{CamPoint\_Moving\_Center}(lat, d, Q_{High}, R)$$

First, during day time the target azimuth $\psi_T$ and the target elevation angle $\alpha_T$ is obtained through sun-positioning software, given the fixed latitude location of the mechanical solar tracker, lat, where:

$$<\psi_T, \alpha_T> \leftarrow \text{Sun}(lat, t)$$

If the cam is 24-hour, then during night time the target values of $\psi_T$, $\alpha_T$ are determined by the process described herein.

Then, the x and y coordinates are directly computed using trigonometry illustrated in FIGS. 14D and 14E, where:

$$x = r^* \cos(\psi_T); \text{ and}$$

$$y = r^* \sin(\psi_T);$$

and:

$$r = R \sin(\alpha_T).$$

The z-coordinate of the point on the surface of elevation cam 30E is calculated based on two components. First the z-offset, $Z_A$, illustrated in FIGS. 14D and 14E, is calculated based on the elevation angle, $\alpha_T$:

$$Z_A = R \cos(\alpha_T).$$

Figure 14F:
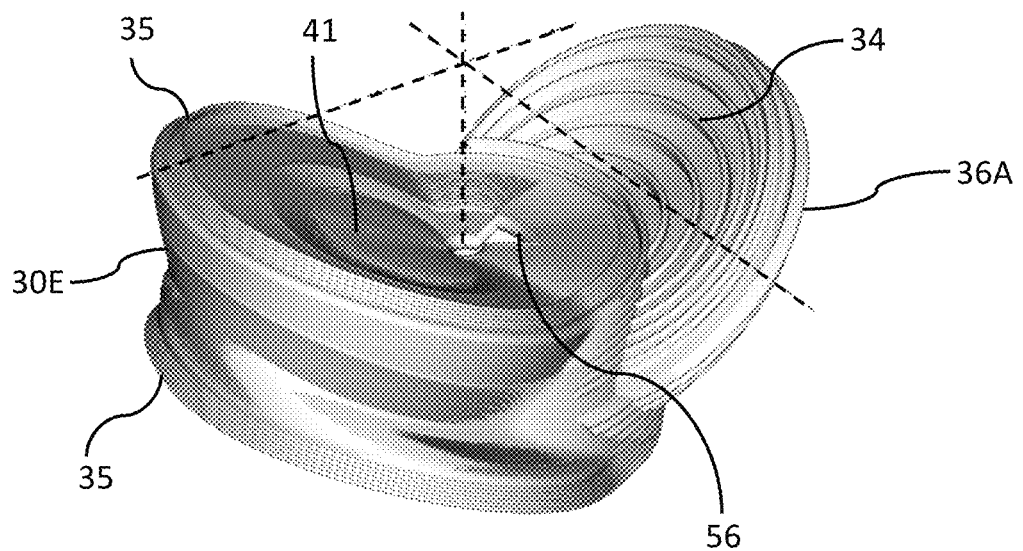
FIGS. 14F and 14G illustrate an example moving-center elevation cam.
Figure 14G:
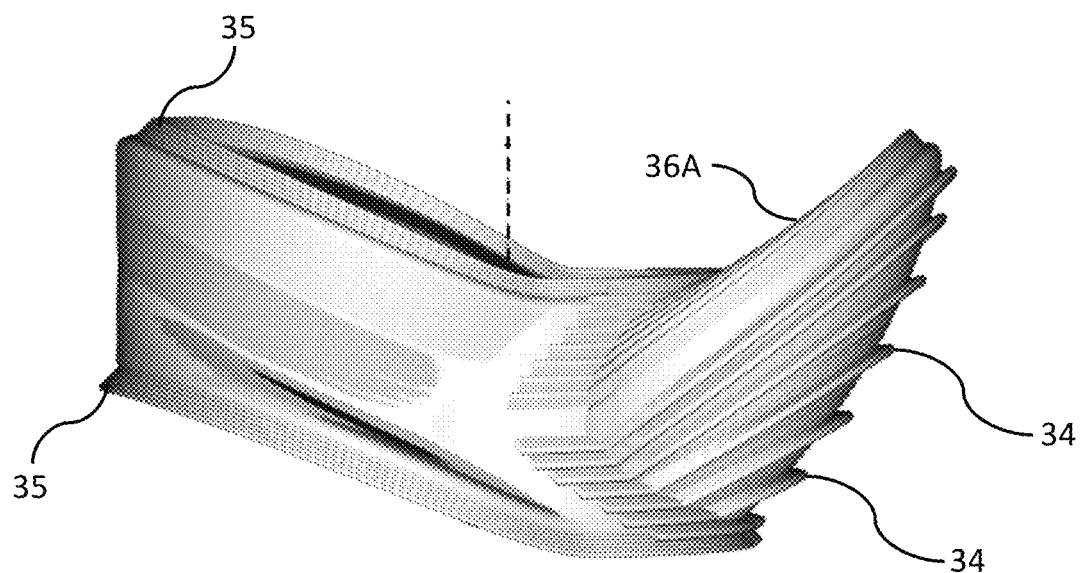

Then, the z-offset due to the day of the year is calculated as illustrated in FIGS. 14F and 14G. Let this offset be q, then q is calculated:

$$q = Q_{High} * q'$$

where q' is equal to:

$$q' = d/365,$$

and d is the number of days from the winter solstice, e.g., d=182, at the summer solstice. The z-coordinate of the point on the surface of elevation cam 30E is given by adding these two offsets:

$$z = Z_A + q$$

The collection of Cartesian coordinates created from each day of the year and each minute of each day, x, y, and z, form a three-dimensional surface that may then be manufactured using a 3D-printer, injection molding, machine press, a pressed wire-mesh surface CNC, or other techniques as the tracking surface of the center-moving elevation cam 30E.

FIGS. 14F and 14G illustrate other views of elevation-cam 30E. Elevation cam 30E includes cam center support 41, which connects the inside of the elevation cam 30 with the cams nuts 48 (not shown) and provides a cam keeper slot 56 for the cam keeper 49 (not shown).

In addition, optional cam follower guides 34 are illustrated on the daylight tracking surface 36A of cam 30E. The guides follow the cam slider path for days spaced at regular intervals and act to prevent a cam slider from moving out of alignment. Similarly, cam skirts 35 may be added to prevent a cam follower from leaving (e.g., falling off) the surface of an elevation cam 30E at beginning or ending operational days of the elevation cam. Any of the elevation cams described herein may be augmented with cam-follower guides 34 or cam skirts 35.

It will be appreciated that several of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

The present invention may be embodied in other specific forms without departing from its spirit or essential characteristics. The described embodiments are to be considered in all respects only as illustrative, and not restrictive. All changes which come within the meaning and range of equivalency of the foregoing description are to be embraced within the scope of the invention.

I claim:

1. A mechanical solar tracker, comprising:
   a frame;
   an elevation cam with an elevation cam surface, the elevation cam attached to the frame;
   a rotation drive mounted to the frame;
   a collector carriage coupled to the rotation drive, the rotation drive operable to rotate the collector carriage about a vertical axis;
   a collector rotatably mounted to the collector carriage about a horizontal pivot axis;
   a cam follower coupled between the collector and the elevation cam, the cam follower configured to translate along the elevation cam surface as the collector carriage rotates about the vertical axis thereby varying a rotated position of the collector relative to the collector carriage;
   wherein the collector carriage and cam follower are configured to track the sun's direction by tracing the elevation cam surface with the cam follower as the sun moves across the sky over a period of time, the elevation cam surface being configured as a function of a latitude location of the mechanical solar tracker.

2. The mechanical solar tracker of claim 1, further comprising:
   a cam-follower travel rod attached to the collector and configured to rotate with the collector about the pivot point;
   a cam-follower travel rod sleeve attached to the cam follower and configured to move a distance, q, along the cam-follower travel rod, the minimum q being $Q_{Low}$ and the maximum q being $Q_{High}$; where q is defined as:

$$q = Q_{Low} + (Q_{Low} + Q_{High}) * q';$$

$$q' = |d - n|/n;$$

d is the number of days from a specified day within a year; and
   n is the number of days for which cam-follower travel rod is configured to move in a single direction.

3. The mechanical solar tracker of claim 2, wherein:
   the collector carriage is configured to rotate circumferentially around the vertical axis on a ring, the ring having a radius, R;
   the cam follower has a length, P;
   the elevation cam surface is defined as an array of x, y, and z surface points, the surface points being a function of a azimuth angle, $\psi_T$, and an elevation angle, $\alpha_T$, of the collector, where:
   x is a horizontal distance extending from the vertical axis in a first direction;
   y is a horizontal distance extending from the vertical axis in a second direction, the second direction being perpendicular to the first direction;
   z is a vertical distance from the pivot point;

$$x = r^* \cos(\psi_T);$$

$$y = r^* \sin(\psi_T);$$

$r=R-r'$; and $r'=q*\sin(\alpha_T)+P*\cos(\alpha_T)$.

4. The mechanical solar tracker of claim 3, wherein:
$\psi_T$ is a function of the sun's azimuth angle, $\psi_s$;
$\alpha_T$ is a function of the sun's elevation angle, $\psi_s$; and
$\psi_s$ and $\alpha_s$, are a function of the latitude location of the mechanical solar tracker, a day of a year, and the time of the day.

5. The mechanical solar tracker of claim 4, wherein:
$\psi_T=\psi_s$; and
$\alpha_T=\alpha_s$.

6. The mechanical solar tracker of claim 4, wherein:
$\psi_s$ and $\alpha_s$ are represented as a unit solar vector, $\vec{S}$, that points from the mechanical solar tracker to the sun;
$\vec{P}$ a unit pointing vector that points from the mechanical solar tracker to a predetermined point;
$\vec{T}$ is a unit tracking vector for the mechanical solar tracker, where $\vec{T}=\vec{S}+\vec{P}$; and
the mechanical solar tracker is configured to position the collector in the direction $\vec{T}$.

7. The mechanical solar tracker of claim 1, wherein the collector carriage and cam follower are further configured to position, based on the surface input from the elevation cam surface, a night-time storage position for the collector.

8. The mechanical solar tracker of claim 1, wherein the collector carriage and cam follower are further configured to position, based on the surface input from the elevation cam surface, a night-time storage position that is normal to the horizontal plane.

9. The mechanical solar tracker of claim 1, wherein the collector carriage travels on a ring and the ring bears the weight of the collector carriage and collector.

10. The mechanical solar tracker of claim 9, wherein the rotation drive is configured to provide a circumferential rotation around the vertical axis from the ring.

11. The mechanical solar tracker of claim 1, wherein the collector carriage and cam follower are further configured to:
rotate circumferentially around the vertical axis, 360-degrees over a 24-hour period;
position the collector normal to the sun's direction during daylight;
position the collector towards a night-time storage position during night-time; and then position again, by dawn, the collector normal to the sun's direction.

12. The mechanical solar tracker of claim 1, wherein the collector carriage and cam follower are further configured to:
rotate circumferentially from east to west around the vertical axis during daylight and position the collector normal to the sun's direction; and
rotate circumferentially from west to east around the vertical axis during night-time and position, by dawn, the collector normal to the sun's direction.

13. The mechanical solar tracker of claim 1, further comprising:
a second elevation cam with second elevation cam surface, the second elevation cam also attached to the frame;
a second cam follower coupled between the collector and the second elevation cam, the second cam follower configured to translate, based on a surface input from the second elevation cam surface, rotation of the collector about the pivot point;

wherein the combination of:
the cam follower coupled between the collector and the elevation cam,
the second cam follower coupled between the collector and the second elevation cam,
the hinge coupled between the collector and the collector carriage, and
the rotation drive,
together provide a kinematic or semi-kinematic interface between the collector and the frame.

14. The mechanical solar tracker of claim 1, wherein the elevation cam surface comprises a mesh surface.

15. The mechanical solar tracker of claim 1, wherein the elevation cam surface further comprises multiple cam-follow guides and a cam skirt.

16. The mechanical solar tracker of claim 1, wherein the collector comprises at least two collectors, each of the collectors being distinct surfaces mechanically coupled to move together and configured to track the sun's direction.

17. The mechanical solar tracker of claim 1, further comprising a second mechanical solar tracker mechanically linked to the mechanical solar tracker of claim 1, wherein:
the mechanical solar tracker of claim 1 further comprises a drive shaft;
the second mechanical solar tracker has its own elevation cam and its own drive shaft; and
both mechanical solar trackers are coupled together and configured to be driven from the rotation drive.

18. The mechanical solar trackers of claim 17, wherein the mechanical solar trackers are configured to rotate a full rotation over a 24-hour period or to rotate in a reciprocal, back-and-forth motion.

19. A mechanical solar tracker, comprising:
a frame;
an elevation cam with an elevation cam surface, the elevation cam attached to the frame;
a rotation drive mechanically coupled to the frame;
a collector carriage coupled to the rotation drive, the collector carriage configured to rotate circumferentially around a vertical axis;
a collector connected to the collector carriage;
a hinge coupled between the collector and the collector carriage, the hinge configured to rotate the collector about a horizontal plane at a pivot point; and
a cam follower coupled between the collector and the elevation cam, the cam follower configured to translate, based on a surface input from the elevation cam surface, rotation of the collector about the pivot point;
a cam-follower travel rod attached to the collector and configured to rotate with the collector about the pivot point;
a cam-follower travel rod sleeve attached to the cam follower and configured to move a distance, q, along the cam-follower travel rod, the minimum q being $Q_{Low}$ and the maximum q being $Q_{high}$; where q is defined as:

$q=Q_{Low}+(Q_{Low}+Q_{High})*q'$;

$q'=|d-n|/n$;

d is the number of days from a specified day within a year;
n is the number of days for which cam-follower travel rod is configured to move in a single direction;
the collector carriage is configured to rotate circumferentially around the vertical axis on a ring, the ring having a radius, R;

the cam follower has a length, P;

the elevation cam surface is defined as an array of x, y, and z surface points, the surface points being a function of a azimuth angle, $\psi_T$, and an elevation angle, $\alpha_T$, of the collector, where:

x is a horizontal distance extending from the vertical axis in a first direction;

y is a horizontal distance extending from the vertical axis in a second direction, the second direction being perpendicular to the first direction;

z is a vertical distance from the pivot point;

$$x = r^* \cos(\psi_T);$$

$$y = r^* \sin(\psi_T);$$

$$r = R - r'; \text{ and}$$

$$r' = q^* \sin(\alpha_T) + P^* \cos(\alpha_T);$$

wherein the collector carriage and cam follower are configured to track the sun's direction, by tracing the elevation cam surface with the cam follower, as the sun moves across the sky over a period of time, the elevation cam surface being configured as a function of a latitude location of the mechanical solar tracker.

20. The mechanical solar tracker of claim 19, wherein:

$\psi_T$ is a function of the sun's azimuth angle, $\psi_s$, $\alpha_T$ is a function of the sun's elevation angle, $\alpha_s$; and $\psi_s$ and $\alpha_s$, are a function of the latitude location of the mechanical solar tracker, a day of a year, and the time of the day.

\* \* \* \* \*